United States Patent [19]

Day

[11] Patent Number: 5,750,824
[45] Date of Patent: May 12, 1998

[54] IRON PHOSPHATE COMPOSITIONS FOR CONTAINMENT OF HAZARDOUS METAL WASTE

[75] Inventor: Delbert E. Day, Rolla. Mo.

[73] Assignee: The Curators of the University of Missouri, Columbia, Mo.

[21] Appl. No.: 606,539

[22] Filed: Feb. 23, 1996

[51] Int. Cl.[6] ................................ A62D 3/00; G21F 9/16
[52] U.S. Cl. ................... 588/256; 65/134.8; 501/155; 588/11; 476/DIG. 385
[58] Field of Search ........................... 588/11, 201, 252, 588/256, 901; 405/128; 65/134.8; 501/155; 476/DIG. 385

[56] References Cited

U.S. PATENT DOCUMENTS

| | | | |
|---|---|---|---|
| 3,365,578 | 1/1968 | Grover et al. | 250/106 |
| 4,087,511 | 5/1978 | Ropp | 423/277 |
| 4,312,774 | 1/1982 | Macedo et al. | 976/DIG. 385 X |
| 4,655,001 | 4/1987 | Lepp et al. | 47/57.5 |
| 4,847,008 | 7/1989 | Boatner et al. | 252/629 |
| 4,847,219 | 7/1989 | Boatner et al. | 501/27 |
| 5,215,563 | 6/1993 | LaCourse et al. | 65/2 |
| 5,262,364 | 11/1993 | Brow et al. | 501/24 |
| 5,298,329 | 3/1994 | Boatner et al. | 428/432 |
| 5,424,042 | 6/1995 | Mason et al. | 588/256 X |
| 5,430,236 | 7/1995 | Macedo et al. | 588/252 |
| 5,536,114 | 7/1996 | Wetmore et al. | 405/128 |
| 5,558,690 | 9/1996 | Hnat et al. | 65/134.8 |

OTHER PUBLICATIONS

W. Heimerl, "A New Method for the Fixation of High Level Radioactive Wastes," *Transactions of American Nuclear Society*, 1975; vol. 20, pp. 669–671.

B.C. Sales et al., "Lead–Iron Phosphate Glass: A Stable Storage Medium for High–Level Nuclear Waste," *Science*, 1984; vol. 226, pp. 45–48.

C.M. Jantzen, "Systems Approach to Nuclear Waste Glass Development," *Journal of Non–Crystalline Solids*, 1986; vol. 84, pp. 215–225.

C.C. Chapman et al., "Electric Melting of Nuclear Waste Glasses," *Journal of Non–Crystalline Solids*, 1986; vol. 84, pp. 226–240.

B.C. Sales et al., "Physical and Chemical Characteristics of Lead–Iron Phosphate Nuclear Waste Glasses," *Journal of Non–Crystalline Solids*, 1986; vol. 79, pp. 83–116.

Lin et al., "Structural Study of Iron in Phosphate Glasses," *Journal of Non–Crystalline Solids*, 1989; vol. 112, pp. 136–141.

Peng et al., "High Thermal Expansion Phosphate Glasses. Part 1," *Glass Technology*, 1991; vol. 32, pp. 166–173.

Kumar et al., "Redox State of Iron and Its Related Effects in the $CaO-P_2O_5-Fe_2O_3$ Glasses," *J. Am. Ceram. Soc.*, 1991; vol. 74, pp. 226–228.

R.K. Brow et al., "The Effect of Fluorine on the Structure of Phosphate Glass," *Physics and Chemistry of Glasses*, 1991; vol. 32, pp. 188–195.

(List continued on next page.)

*Primary Examiner*—George A. Suchfield
*Attorney, Agent, or Firm*—Senninger, Powers, Leavitt & Roedel

[57] ABSTRACT

An improved iron phosphate waste form for the vitrification, containment and long-term disposition of hazardous metal waste such as radioactive nuclear waste is provided. The waste form comprises a rigid iron phosphate matrix resulting from the cooling of a melt formed by heating a batch mixture comprising the metal waste and a matrix-forming component. The waste form comprises from about 30 to about 70 weight percent $P_2O_5$ and from about 25 to about 50 weight percent iron oxide and has metals present in the metal waste chemically dissolved therein. The concentration of iron oxide in the waste form along with a high proportion of the iron in the waste form being present as $Fe^{3+}$ provide a waste form exhibiting improved chemical resistance to corrosive attack. A method for preparing the improved iron phosphate waste forms is also provided.

22 Claims, 21 Drawing Sheets

OTHER PUBLICATIONS

R.K. Brow et al., "An X-Ray Photoelectron Spectroscopy Study of Anion Bonding in Tin (II) Flurophosphate Glass," *Physics and Chemistry of Glasses*, 1992; vol. 33, pp. 33, pp. 33–39.

B. Kumar et al., "Effects of Melting Atmosphere on Properties of a Glass in the $CaO-P_2O_5-Fe_2O_3$ System," *Physics and Chemistry of Glasses*, 1992; pp. 204–206.

B. Kumer et al., "Glass Formation, Crystallisation and Magnetic Properties of Glasses in the $CaO-P_2O_5-Fe_2O_3$ System," *Physics and Chemistry of Glasses*, 1994; vol. 35, pp. 128–131.

R.K. Brow et al., "An XPS Study of Iron Phosphate Glasses," *Physics and Chemistry of Glasses*, 1994; vol. 35, pp. 132–136.

W.G. Ramsey et al., "Innovative Glass Compositions for Immobilizing Actinide Elements," *Spectrum '94*, 1994; pp. 1–2.

Ramsey et al., "Compositions and Durabilities of Glasses for Immobilization of Plutonium and Uranium," *WM95 WM Symposia*, Inc., 1995; pp. 1–10.

B. Kumar, "Compositions, Processing, and Properties of Glasses in the $CaO-P_2O_5-Fe_2O_3$ System," 1995; pp. 1–6.

Y. Xiaoyan et al., "Effect of Raw Materials on the Redox State of Iron and Properties of Iron-Phosphate Glasses," 1995; pp. 1–7.

5,750,824

1

IRON PHOSPHATE COMPOSITIONS FOR CONTAINMENT OF HAZARDOUS METAL WASTE

The U.S. Government has rights in this invention pursuant to Contract No. 214582-A-L2 awarded by the Department of Energy through Battelle Pacific Northwest Labs.

BACKGROUND OF THE INVENTION

The present invention relates to rigid waste forms for containing hazardous metal waste comprising an iron phosphate matrix in which the metal waste has been chemically dissolved and to methods for preparation of such waste forms.

The storage and containment of hazardous metal waste presents a significant environmental problem. In the case of radioactive fissile materials generated by the medical, commercial power and defense weapons industries, the problems attendant storage are particularly acute due to the long half-lives of some radionuclides found in high level nuclear waste, which require that the waste be stored safely and monitored for hundreds to thousands of years.

The safe storage and containment of radioactive nuclear waste is a problem in dire need of a solution. Large quantities of radioactive materials have been stored temporarily, typically in the form of a containerized liquid or sludge, pending a resolution to the problem of their longterm storage. The stockpile of nuclear waste awaiting permanent disposition has grown to tremendous proportions.

Recently, the nuclear waste disposal industry has turned to immobilizing radioactive materials in stable, rigid waste forms produced by heating a mixture of the waste and a frit of an acceptable "host" glass to form a melt. The melt is transferred to a suitable container (e.g., stainless steel or aluminum alloy canisters) and cooled to form a rigid, typically vitreous waste form that traps the radioactive materials. This containment method is commonly referred to as vitrification. The waste forms are then sealed and transferred to a facility (e.g., an underground geologic repository) for long-term storage and monitoring.

Much of the research pertaining to nuclear waste storage in rigid waste forms has centered on identifying suitable host glasses, which when combined with a particular waste, provide a waste form having the properties necessary for safe, long-term disposal. Waste forms for the internment of hazardous materials desirably have (1) a high chemical durability and resistance to corrosion; (2) a relatively low melting temperature to avoid excessive volatilization of the waste and corrosion of process equipment during preparation of the melt; (3) a relatively high devitrification or recrystallization temperature to avoid decreases in the stability of the waste form at elevated storage temperatures produced by the decay of radioactive species; and (4) a high waste loading capability (i.e., ability to solubilize a high concentrations of metal waste) to minimize the volume of the waste form.

Various glass compositions have been suggested and tested for their suitability as host glasses used in the preparation of vitrified waste forms for interning radioactive metal waste. The majority of attention in this area has been placed on silicate, especially borosilicate, glasses. However, silicate glasses have several disadvantages which detract from their desirability as a universal waste storage medium for hazardous metal waste. Silicate glasses lack adequate compositional flexibility needed in many waste disposal applications. That is, the solubility of some compounds is limited in silicate glasses and, therefore, a larger volume of the host glass is required to immobilize waste containing such compounds. Waste containing metal phosphates and halides (e.g., fluorides and chlorides) are particularly incompatible with silicate glasses since relatively low concentrations of such waste results in the formation of immiscible glasses that may have an unsuitable chemical durability. Furthermore, the melting temperature of silicate glasses is relatively high and may lead to excessive volatilization of the waste during preparation of the waste form as well as increased chemical attack on the melter and other high temperature processing equipment.

It is generally known that phosphate glasses exhibit properties not attainable in borosilicate glasses which may be desirable in certain glass applications. Phosphate glasses are technologically interesting materials because they generally have higher thermal expansion coefficients and lower melting temperatures than many silicate glasses so they are potential candidates for sealing to low melting metals such as aluminum. With regard to waste disposal, phosphate glasses offer a lower melting point than silicate glasses and can solubilize high concentrations of waste containing metal phosphates, halides and heavy metals (e.g., transuranic elements). However, due to their usually low chemical durability in comparison to silicate glasses, phosphate glasses generally have not been considered an attractive alternative to silicate glasses when it comes to disposal of hazardous metal waste.

Although used less than silicate glasses in waste disposal applications, it is generally known that phosphate glasses may be used to intern radioactive metal waste. U.S. Pat. No. 4,847,008 (Boatner, et al.) discloses a nuclear waste composite formed from solidifying a melt of a lead phosphate host glass (45–66 weight percent PbO and 30–55 weight percent $P_2O_5$), a mixture of radioactive metal oxide waste and up to about 9 weight percent $Fe_2O_3$ based on the total weight of the composite. U.S. Pat. No. 4,847,219 (Boatner, et al.) is a continuation-in-part of U.S. Pat. No. 4,847,008 and is directed to lead-iron phosphate glass compositions per se, rather than waste storage composites. The lead-iron phosphate glass compositions can be used not only as a host glass in forming waste storage composites, but also as a material of construction (e.g., protective coatings, variable density optical filters and passive solar absorbers). The lead-iron phosphate glasses contain 40–66 weight percent PbO, 30–55 weight percent $P_2O_5$ and up to12 weight percent $Fe_2O_3$. The lead-iron phosphate glasses disclosed by Boatner, et al. are said to exhibit reduced susceptibility to aqueous corrosion as compared to pure lead phosphate glasses and provide a composite with improved chemical durability. However, the phosphate glasses employed by Boatner, et al. are hampered by the presence of lead, a well-known toxicant, which presents a health risk to individuals involved in the preparation and handling of the glass. The potential toxicity and manufacturing precautions associated with lead containing glasses is a significant disadvantage.

U.S. Pat. No. 3,365,578 (Grover, et al.) discloses a vitreous waste storage composite for containing radioactive metal oxide waste comprising the fusion product of a variety of glass forming oxides and the waste oxides enclosed within a steel cylinder. In the case where a phosphate glass is employed, Grover, et al. disclose adding up to 20 weight percent iron oxide to the glass to inhibit excessive corrosion of the steel cylinder.

Although phosphate and lead phosphate glasses containing iron oxide as taught by Boatner, et al. and Grover, et al.

have been used to vitrify hazardous metal waste, further improvement in the chemical durability of phosphate glass waste forms used in the long-term disposition of hazardous metal waste is desirable so that the potential advantages of phosphate glasses as waste disposal media can be more fully realized.

SUMMARY OF THE INVENTION

Among the objects of the present invention, therefore, are the provision of improved rigid waste forms for the long-term internment and disposal of hazardous metal waste comprising an iron phosphate matrix in which the waste metals are immobilized and methods for the preparation of such waste forms; the provision of such waste forms exhibiting exceptional chemical durability and resistance to corrosive attack such that the potential for release of the hazardous metal waste contained therein into the environment is minimized; the provision of such waste forms which can be prepared at relatively low melt temperatures; the provision of such waste forms which are compatible with relatively high concentrations of phosphate and halide metal waste; the provision of such waste forms in which chemical durability is essentially unaffected by the devitrification (i.e., crystallization) of the waste forms; and the provision of such waste forms which can be prepared economically using conventional waste form fabrication technology.

Briefly, therefore, the present invention is directed to a waste form for containment of hazardous metal waste comprising a rigid iron phosphate matrix resulting from the cooling of a melt formed by heating a batch mixture comprising the metal waste and a matrix-forming component. The waste form comprises from about 30 to about 70 weight percent $P_2O_5$ and from about 22 to about 50 weight percent iron oxide and has metals present in the metal waste chemically dissolved therein.

The present invention is further directed to a method for containment of hazardous metal waste in a rigid waste form. The method comprises heating a batch mixture comprising the metal waste and a matrix-forming component at a temperature not in excess of about 1250° C. to form a melt. The melt is subsequently cooled to form the rigid waste form having metals present in the metal waste chemically dissolved therein. The composition of the batch mixture is controlled such that the waste form comprises from about 30 to about 70 weight percent $P_2O_5$ and from about 22 to about 50 weight percent iron oxide.

Other objects and features of this invention will be in part apparent and in part pointed out hereinafter.

DETAILED DESCRIPTION OF THE PREFERRED EMBODIMENTS

Figure 1:
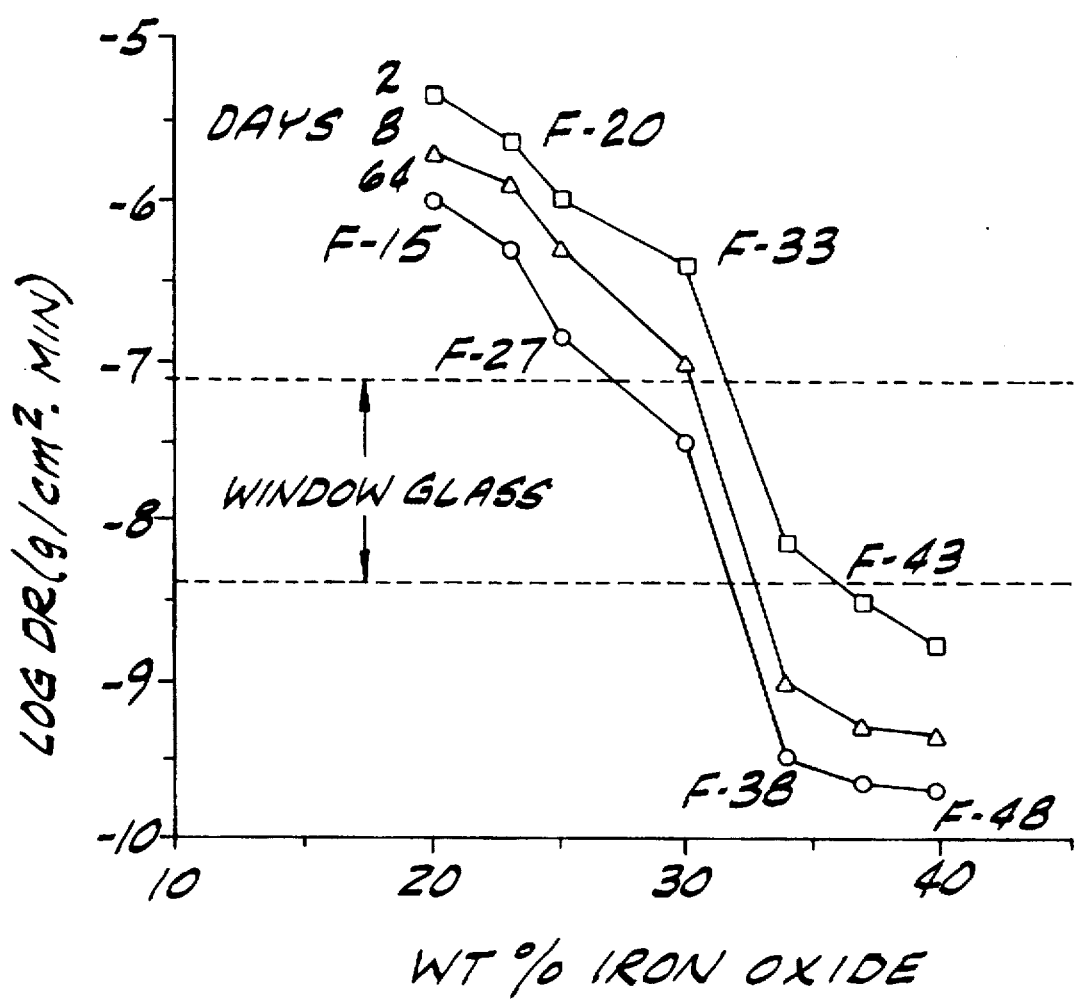
FIG. 1 shows the log of the bulk dissolution rate after 2, 8 and 64 days of immersion in distilled water at 90° C. plotted as a function of the measured iron oxide content for the iron phosphate glasses prepared in Example 1.

In accordance with the present invention, improved rigid composites comprising hazardous metal waste immobilized in an iron phosphate matrix (i.e., waste forms) are provided. The waste forms are suitable for the confinement and longterm disposition of radioactive nuclear materials as well as other potentially hazardous metal waste.

The waste forms of the present invention are prepared by solidifying (i.e., cooling) a melt produced by heating a batch mixture comprising the hazardous metal waste to be interned and a suitable matrix-forming component. The melt may be produced using well-known, conventional melters and processing technology used in the production of silicate and borosilicate waste forms such as described by Chapman, et al. in "Electric Melting of Nuclear Waste Glasses—State of the Art", *Journal of Non-Crystalline Solids*, 84, pp. 226–240 (1986), the disclosure of which is expressly incorporated herein by reference. Once formed the melt may be transferred to a suitable container (e.g., stainless steel or aluminum alloy canisters) and cooled to form the rigid waste form. Upon sealing the container, the waste form is ready for longterm disposition and monitoring in a suitable storage facility (e.g., an underground geologic repository).

In accordance with several features of the present invention, the chemical durability of a phosphate-based waste form is improved and other advantageous results achieved. These features include providing the waste form with an elevated concentration of iron oxide, controlling the oxidation state of iron in the waste form to increase the proportion of iron present as $Fe^{3+}$ and including a metal halide in the batch mixture heated to form the melt from which the waste forms are produced.

It has been discovered that by providing the waste form with an elevated iron oxide content several important properties of the waste form are favorably influenced. More specifically, a higher concentration of iron oxide provides a waste form exhibiting increased chemical durability, density and dilatometric softening temperature and a reduced thermal expansion coefficient. The iron phosphate waste forms of the present invention comprise from about 18 to about 50 weight percent iron oxide and from about 30 to about 70 weight percent $P_2O_5$. Preferably, the waste forms comprise from about 22 to about 50 weight percent iron oxide and at least about 40 weight percent $P_2O_5$. It has been further observed that as the iron oxide content of the waste forms of the present invention are increased to at least about 30 weight percent, a significant further improvement in the chemical durability of the waste form is achieved. Thus, in accordance with a more preferred embodiment of the present invention, the waste form has an iron oxide content of at least about 30 weight percent, more preferably from about 30 to about 45 weight percent iron oxide and especially from about 38 to about 45 weight percent.

The matrix-forming component of the batch mixture may comprise an appropriate mixture of compounds in the form of liquids and/or solids which when heated along with the metal waste yields a melt, and consequently, a waste form of the desired composition. Thus, the melt may be prepared from a batch mixture comprising the metal waste, $P_2O_5$ or a compound which readily decomposes to $P_2O_5$ upon heating (e.g., $(NH_4)_2HPO_4$, $(NH_4)H_2PO_4$, $AlPO_4$ and $H_3PO_4$) and iron oxide (e.g., FeO, $Fe_2O_3$ and $Fe_3O_4$) or other source of iron which when heated in the presence of oxygen forms iron oxide. Furthermore, some or all of both the requisite $P_2O_5$ and iron oxide content of the waste form could be derived from suitable iron-phosphorus compounds (e.g., $H_2(FeP_3O_{10}).2H_2O$, $FePO_4$, $Fe_3(P_2O_7)_2$, $Fe_3(PO_4)_2.8H_2O$, $FePO_4.2H_2O$ and $Fe_4(P_2O_7)_3$) present in the batch mixture.

Preferably, the matrix-forming component of the batch mixture comprises a previously prepared iron phosphate host glass frit. In preparing the waste forms of the present invention, this practice is preferred because it simplifies the process by minimizing the number of components which must be combined and heated to form the melt and may reduce the melting temperature of the batch mixture. In order to facilitate melting and greater melt homogeneity, the iron phosphate glass frit is preferably ground or milled prior to being introduced into the batch mixture. For example, iron phosphate host glass frits for use in the present invention suitably have an average particle diameter of less than about 150 μm.

A suitable host glass frit may be prepared from binary mixtures of $P_2O_5$ and iron oxide (e.g., FeO, $Fe_2O_3$ and $Fe_3O_4$) or from appropriate mixtures of various phosphorus and iron containing compounds such as those noted above. A variety of other oxides may also be present in the iron phosphate host glass frit such as alkali and alkaline earth metal oxides, $SiO_2$, $Al_2O_3$ and $ZrO_2$. However, in order to avoid potential toxicity problems caused by exposure to such materials, it is preferred that the host glass be essentially free of lead and other known toxicants. The host glass frit can be prepared using conventional commercial glass-forming facilities and techniques since the hazardous material is not present at this stage of the production of the waste form. A host glass having a low melting point is desirable in order to ease preparation of the frit and avoid excessive loss of $P_2O_5$ during preparation of the host glass. Preferably, the iron phosphate host glass has a melting temperature not in excess of about 1250° C.

Whether a mixture of iron and phosphorus containing compounds or an iron phosphate host glass frit is employed, it should be understood that the required composition of the matrix-forming component of the batch mixture is dependent upon the composition of the hazardous metal waste, especially with regard to the concentration of iron and phosphorus already present in the waste. That is, because phosphorus and iron present in the waste will contribute to the $P_2O_5$ and iron oxide content of the waste form, the composition of the matrix-forming component of the batch mixture should be tailored accordingly to obtain a waste form having the desired composition. For example, high-level nuclear waste generated by the defense industry typically contains high concentrations of $Fe_2O_3$. Thus, in preparing a waste form for containment of such waste, all or substantially all of the iron oxide content of the waste form may be derived from iron present in the waste with little or no iron being necessary in the matrix-forming component of the batch mixture. However, in other cases, the iron and phosphorus content of the metal waste will be insufficient to provide a waste form having the requisite iron oxide and $P_2O_5$ content and the deficiency will have to be made up by iron and phosphorus present in the matrix-forming component of the batch mixture. Once the composition of the metal waste has been ascertained, the composition of the matrix-forming component of the batch mixture necessary to provide a waste form having a particular composition can be readily determined.

The iron phosphate waste forms may be used to immobilize and intern a wide variety of hazardous metal wastes. The waste forms described herein provide an excellent storage medium for low and high level radioactive metal waste of the containerized liquid, sludge or slurry type generated by the medical, commercial power and defense weapons industries and presently in interim storage at numerous hazardous material repositories. The metal waste may contain radioactive cesium, strontium, lanthanides and actinides (e.g., transuranic elements). In accordance with a preferred embodiment of the present invention, the iron phosphate waste form contains both cesium and strontium chemically dissolved therein. Waste forms in accordance with the present invention which have both cesium and strontium incorporated in the iron phosphate matrix exhibit a superior chemical durability as compared to waste forms containing only cesium or strontium. Although the waste forms of the present invention are particularly useful in the vitrification of radioactive waste, it should be understood that the utility of the waste forms of the present invention is not limited to the containment of such metal waste. For example, heavy metal waste containing Am, Th, Cf, Zr, Cm, U, Pu, Cr, Cd, Pb, Ru, Rh, Ba, Bi, and rare earth elements as well as other metal waste which poses an environmental hazard may be interned in the iron phosphate waste forms. The metals in the waste may be present in a variety of compounds, including oxides, halides, carbonates, silicates, phosphates, nitrates, hydroxides, acetates, citrates or sulfates and the waste may be in the form of liquids, slurries, sludges or solids. Furthermore, it should be understood that the waste materials interned in the waste forms of the present invention may be substantially pure or comprise heterogenous mixtures of more than one hazardous metal compound combined with other compounds such as $SiO_2$, $Al_2O_3$, $ZrO_2$, $Fe_2O_3$ and alkali and alkaline earth oxides, nitrates and sulfates as well as other metallic compounds.

The amount of metal wastes incorporated into the iron phosphate waste forms may vary considerably. In some applications it may be advantageous to immobilize relatively small amounts of the metal wastes (e.g., less than 5 weight percent) in the waste form. However, in order to minimize the volume of the waste form, it will typically be advantageous to maximize the amount of waste material incorporated in the waste form while still providing a waste form having the desired chemical durability. The maximum amount of metal waste which can be chemically dissolved in the iron phosphate waste forms is dependent upon the waste mixture and the solubility of its various constituents in the iron phosphate matrix. Preferably, the waste forms of the present invention include at least about 20 weight percent of the waste metal.

The iron phosphate waste forms disclosed herein are particularly suited for the disposal of radioactive metal phosphates and halides, especially fluorides and chlorides, as well as substantially pure transuranic nuclear waste. The ability of the iron phosphate waste forms of the present invention to serve as a suitable containment medium for radioactive metal halide waste is believed to be particularly significant in the vitrification of nuclear waste since there are large quantities of nuclear waste containing radioactive metal halides (e.g., fluorides and chlorides of radioactive Cs-137 and Sr-90) currently awaiting long-term disposition and disposal of such waste in silicate and borosilicate glasses is hampered by the inability of such glasses to dissolve appreciable quantities of such waste. Disposal of radioactive metal halide waste in a silicate or borosilicate glass typically requires that the waste first be converted into oxides prior being incorporated into the glass. The ability to directly dissolve substantial amounts of these metal halide wastes in an iron phosphate matrix without the necessity of first converting the waste into oxides is a significant advantage.

In accordance with one embodiment of the present invention, the hazardous metal waste component of the batch mixture comprises at least one compound selected from the group consisting of radioactive CsF, $SrF_2$, CsCl and $SrCl_2$. Such a waste component may be substantially pure, comprising more than about 90 weight percent of these radioactive compounds. The waste form may comprise up to about 30 weight percent of the radioactive metals derived from such halide waste compounds without significantly compromising the chemical durability of the waste form. However, due to internal heating effects caused by radioactive decay of Cs-137 which may lead to excessive heating of the waste form during storage, it is preferred that the waste form comprise less than about 5 weight percent cesium present in the form of radioactive Cs-137.

Iron in the iron phosphate composites described herein is present in chiefly two oxidation states, namely $Fe^{2+}$ and $Fe^{3+}$. It has been further discovered that the chemical durability and other important properties of the waste form may be favorably influenced by controlling the oxidation state of the iron present in the composite. Generally, increasing the proportion of iron contained in the waste form present as $Fe^{3+}$ increases the chemical durability, density and dilatometric softening temperature exhibited by the composite, while decreasing the thermal expansion coefficient. Although the present invention is not limited by such a theory, it is believed that the improvement in chemical durability with increased $Fe^{3+}$ content may be explained by P—O—P bonds being replaced by more chemically resistant P—O—$Fe^{3+}$ bonds.

In accordance with the present invention, the melt from which the waste form is produced is preferably prepared under sufficiently oxidizing conditions such that at least about 50 percent, more preferably at least about 80 percent and especially at least about 90 percent of the iron contained in the waste form is present in the form of $Fe^{3+}$. A variety of factors related to preparation of the melt, including the composition of the raw materials present in the batch mixture, the melt atmosphere and the melt temperature, have an impact on the oxidation state of iron contained in the waste form. A waste form containing the desired proportion of iron present as $Fe^{3+}$ is obtained by controlling these various factors.

In order to increase the proportion of iron present in the waste form as $Fe^{3+}$, the batch mixture preferably does not contain appreciable amounts of material which promotes the formation of reducing conditions during preparation of the melt. For example, $(NH_4)_2HPO_4$ and $(NH_4)H_2PO_4$ used in the batch mixture as a source $P_2O_5$, release ammonia when heated which tends to promote the reduction of iron present in the batch mixture to $Fe^{2+}$ in the waste form. This effect is especially pronounced in waste forms having lower iron oxide concentrations. Therefore, in order to increase the $Fe^{3+}$ content of the waste form, the batch mixture should be substantially free of material which when heated promotes the formation of reducing conditions during preparation of the melt. For example, sources of iron oxide and $P_2O_5$ such as $P_2O_5$, $AlPO_4$, $H_3PO_4$ and $Fe_4((P_2O_7)_3$ may be employed. Furthermore, it has been determined that as the concentration of iron oxide in the melt and, consequently, the waste form increases, a greater proportion of the iron present in the waste form tends to be present in the form of $Fe^{3+}$ rather then $Fe^{2+}$. The increase in the ratio of $Fe^{3+}$ to $Fe^{2+}$ in the waste form is especially pronounced when the iron oxide content of the waste form is at least about 30 weight percent. Thus, in order to further increase the proportion of iron present as $Fe^{3+}$ in the waste form, the batch mixture should contain enough iron such that the iron oxide content of the waste form is at least about 30 weight percent.

In order to promote the oxidation of iron and increase the levels of $Fe^{3+}$ present in the waste form, the batch materials are heated in the presence of oxygen (e.g., air). Preferably, the melt from which the waste form is produced is prepared in an oxygen-enriched atmosphere containing at least about 50 mole percent oxygen, more preferably at least about 70 mole percent oxygen and especially at least about 80 mole percent oxygen so that oxidation of iron present in the batch mixture is substantially maximized. In order to further promote the oxidation of iron and increase the levels of $Fe^{3+}$ present in the waste form, an oxygen-containing gas (e.g., air) may be bubbled through the melt. Furthermore, it should be understood that preparing the melt in an oxygen-enriched atmosphere may counteract factors which tend to promote $Fe^{2+}$ in the waste form (e.g., batch materials which release ammonia upon being heated) such that the desired proportion of iron in the waste form present as $Fe^{3+}$ might still be achieved.

Increased melt temperature tends to favor the production of $Fe^{2+}$ over $Fe^{3+}$ in the waste form. Thus, in order to increase the proportion of iron present as $Fe^{3+}$ in the waste form, the batch mixture should not be heated to a temperature in excess of that necessary to form a sufficiently homogeneous melt. The temperature required to achieve a sufficiently homogeneous melt is dependent upon the composition of the batch mixture. Thus, in order to increase the proportion of iron in the waste form present as $Fe^{3+}$, the composition of the batch mixture is preferably controlled such that the melt temperature does not exceed about 1250° C., more preferably does not in exceed of about 1150° C. and especially does not exceed about 1100° C. In addition to having a favorable effect on the oxidation of iron present in the batch mixture, decreased melt temperatures avoid excessive volatilization of the waste and corrosion of the melt apparatus.

In accordance with the present invention, it has been further discovered that advantageous results may be achieved if the batch mixture further includes a metal halide. The metal halide in the batch mixture can enhance the chemical durability of the waste form, improves the glass-forming capability of the melt (i.e., decreases the tendency to crystallize) and tends to lower the melt temperature and viscosity. A low melting temperature is advantageous in waste immobilization applications since the vaporization of hazardous materials from the melt is minimized and the chemical attack on the process equipment is reduced.

The amount of metal halide present in the batch mixture necessary to achieve the beneficial effects resulting from the presence of metal halide will vary with the composition of the waste material. Preferably, the batch mixture comprises at least about 1 weight percent metal halide, more preferably at least about 5 weight percent metal halide. However, in some instances, higher concentrations of metal halide in the batch mixture may cause an undesirable decrease in the chemical durability of the waste form. The quantity of metal halide necessary to achieve the optimum beneficial effects can be determined on a case by case basis through routine experimentation.

Although the metal halide is present in the batch mixture, it should be understood that a substantial portion of the halide anion may be vaporized during the melting process so that the waste form does not have appreciable halide content. Thus, it appears that the halide content of the batch mixture induces the above-described beneficial effects by being present during melting of the batch mixture, even though halide may not be incorporated to any significant extent into the iron phosphate matrix of the waste form.

In the practice of the present invention, various metal halides can be incorporated into the batch mixture, including $AlF_3$ and alkali metal and alkaline earth metal halides, preferably fluorides and chlorides of such metals. In accordance with an especially preferred embodiment of the present invention, the metal halide present in the batch mixture is $CaF_2$.

The metal halide in the batch mixture used to form an iron phosphate waste form may be derived wholly or partially from metal halides present in the hazardous metal waste and may contain radioactive elements (e.g., fluorides and chlorides of radioactive Cs-137 and Sr-90). If the metal oxide-containing waste is deficient in metal halide content, metal halide may be added as a separate component to the batch mixture. Alternatively, halide may be incorporated into an iron phosphate host glass frit used to prepare the batch mixture.

It has been further discovered that unlike many conventional waste forms, the iron phosphate waste forms of the present invention do not suffer a significant decrease in chemical durability when partially or wholly crystallized. Thus, it should be understood that the waste forms in accordance with the present invention may contain both crystalline and vitreous phases in varying proportions. Furthermore, special precautions are not necessary in the practice of the present invention to prevent crystallization caused by slower cooling rates at the center of a waste form having a large cross section. However, in order to maximize chemical durability and provide uniform properties throughout the waste form, it is preferred that the waste form of the present invention be wholly or substantially vitreous. By substantially vitreous, it is meant that less than about 5 weight percent of the iron phosphate matrix is crystalline phase. Substantially vitreous waste forms can be obtained by controlling the composition of the batch mixture (e.g., increasing the phosphorus content or including a metal halide) and increasing the rate at which the melt cools. The ability of the iron phosphate waste forms to maintain sufficient chemical durability even when crystallized is an important advantage as compared to borosilicate waste forms which often exhibit considerable reductions in corrosion resistance due to the presence of crystalline phase inhomogeneities.

As noted previously, the iron phosphate waste forms of the present invention comprising from about 18 to about 50 weight percent iron oxide provide a containment medium for hazardous metal wastes which exhibits improved chemical durability and resistance to corrosive attack. Furthermore, in accordance with the present invention, the chemical durability of an iron phosphate waste form may be enhanced independent from or in addition to an elevated iron oxide content by increasing the proportion of iron present in the waste form as $Fe^{3+}$ and by including a metal halide in the batch mixture heated to form the melt from which the waste form is produced. One way of characterizing the chemical durability of a waste form used to contain hazardous metal wastes is by assessing its resistance to corrosion upon immersion in a solvent (e.g., distilled water). Preferably, the various features of the present invention are employed through routine experimentation to obtain a waste form exhibiting a dissolution rate in distilled water having a pH from about 6.5 to about 7.3 at 90° C. is less than about $1 \times 10^{-7}$ g/cm².min, more preferably less than about $5 \times 10^{-8}$ g/cm².min and especially less than about $5 \times 10^{-9}$ g/cm².min. By achieving such chemical durability characteristics and resistance to corrosive attack, the iron phosphate waste forms provided by the present invention minimize the potential for release of the hazardous metal waste contained therein into the environment.

The present invention is illustrated by the following examples which are merely for the purpose of illustration and are not to be regarded as limiting the scope of the invention or manner in which it may be practiced.

EXAMPLE 1

In this Example, several iron phosphate glasses were made from batch mixtures containing compounds selected from $NH_4H_2PO_4$, $Fe_2O_3$ and $Fe_4(P_2O_7)_3$. The compounds, in powder form, were dry mixed in varying proportions. The dry mixture was placed in a high-purity, alumina crucible and melted in an air atmosphere within an electric furnace for 1 to 2 hours at temperatures between 1050° and 1200° C. Each melt was cast into a steel mold to form rectangular bars (1 cm×1 cm×15 cm) which were annealed at 400° to 500° C. for 1 to 2 hours and then slowly cooled to room temperature.

The compositions of the iron phosphate glasses were determined by Energy Dispersive Analysis by X-ray (EDAX) using a Kevex (7000 series) EDAX System available form Kevex Corporation, Foster City Calif. The compositions of the iron phosphate glasses, rounded to the nearest 0.1 weight percent, are set forth in Table 1. It should be understood that in this and subsequent Examples, it was assumed that all iron oxide measured using EDAX analysis was present in the form of $Fe_2O_3$. In Table 1 and subsequent tables, "nm" indicates that the value was not measured.

TABLE 1

| Code | Analyzed EDAX Composition (wt %) | | | |
|---|---|---|---|---|
| | iron oxide | $P_2O_5$ | $Na_2O$ | $Al_2O_3$ |
| F-15 | 20.0 | 78.0 | 2.0 | nm |
| F-20 | 23.0 | 74.7 | 2.3 | 0.6 |
| F-27 | 25.0 | 72.0 | 3.0 | 0.6 |
| F-33 | 30.0 | 67.0 | 3.0 | 0.7 |
| F-38 | 34.0 | 62.0 | 4.0 | nm |
| F-43 | 37.0 | 57.0 | 6.0 | nm |
| F-46 | 39.9 | 55.4 | 4.7 | nm |

Initially, these glasses were not intended to contain any sodium oxide ($Na_2O$). However, a small amount (2.0 to 6.0 weight percent) of $Na_2O$ was inadvertently introduced into the iron phosphate glasses as an impurity present in the $Fe_4(P_2O_7)_3$ batch material. Furthermore, a small amount (less than 1 weight percent) of $Al_2O_3$ was detected in some of the iron phosphate glasses resulting from contamination of the melt by the alumina crucible used in preparing the melts.

X-ray diffraction analysis (XRD) showed that each of the compositions in Table 1 formed a glass with no crystalline phases. Iron phosphate glass compositions (not listed in Table 1) containing from 40 to 55 weight percent iron oxide were partly crystallized, whereas, compositions containing more than 55 weight percent iron oxide were totally crystallized, when melted and annealed as previously described. With increasing iron oxide content, the melting temperature of the glasses increased as did the tendency for devitrification.

Samples were cut from the annealed bars for property measurement. The density of each glass was measured at 22° C. by Archimedes' method using water as the suspending medium. The thermal expansion coefficient (α) and dilatometric softening temperature ($T_d$) were measured with a fused silica dilatometer (Orton dilatometer, The Edward Orton, Jr. Ceramic Foundation, Westerville, Ohio USA) on a sample 2.54 cm in length which was heated in air at 3° C./min. The values for these measured properties and the glass melting temperature are set forth below in Table 2. The estimated error in the dilatometric softening temperature was ±5° C. The value of the thermal expansion coefficient reported in Table 2 is the calculated average from 25° to 300° C. and has an estimated error of $\pm 5 \times 10^{-7}/°C$.

TABLE 2

| Code | Density (g/cm³) | $T_d$ (°C.) | α ($1 \times 10^{-7}/°C$.) | Melting Temperature (°C.) |
|---|---|---|---|---|
| F-15 | 2.78 | 450 | 110 | 1200 |
| F-20 | 2.80 | 455 | 117 | 1200 |
| F-27 | 2.84 | 465 | 105 | 1150 |
| F-33 | 2.95 | 492 | 97 | 1150 |
| F-38 | 2.98 | 495 | 88 | 1050 |
| F-43 | 3.04 | 502 | 77 | 1100 |
| F-46 | 3.11 | 510 | 74 | 1100 |

The density of the iron phosphate glasses at 22° C. and the dilatometric softening temperature increased linearly with increasing iron oxide content, whereas the thermal expansion coefficient decreased linearly with increasing iron oxide content.

The effect of iron oxide content on the chemical durability of these iron phosphate glasses was assessed by measuring the dissolution rate of the glasses in both distilled water and in a saline solution (0.85% NaCl) at 90° C. Rectangular samples (1×1×1 cm) were cut, ground, polished to 600 grit, oven dried, and weighed. The dimensions were measured before placing the glass samples in high-density polyethylene bottles which contained 100 ml of either distilled water or the saline solution. The initial pH of the distilled water and saline solution was 6.9 and 6.2, respectively. The bottles were placed in a constant-temperature oven at 90° C. The weight (±0.1 mg) of each sample was measured after immersion in distilled water or saline solution for 2, 4, 8, 16, 32, and 64 days. To determine the weight of a sample, the sample was removed from the solution, rinsed in distilled water, dried in an oven at 120° C. for 1 hour and weighed. The dissolution rate (DR) for each sample was calculated from the weight loss, surface area and time immersed in distilled water or saline solution using the equation DR=ΔW/(A×t), where ΔW is the weight change (g), A is the sample surface area (cm²), and t is the immersion time (min.). Fresh solvent was used after each weight measurement.

Figure 2:
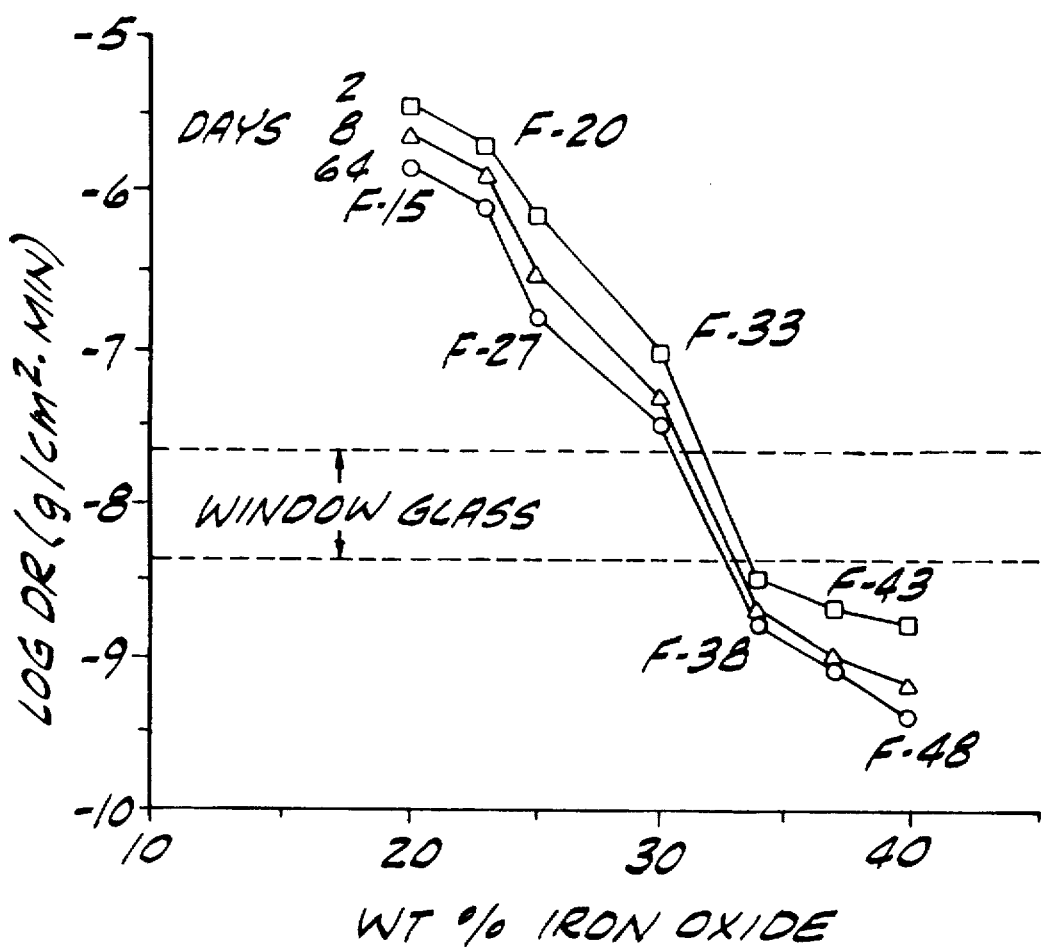
FIG. 2 shows the log of the bulk dissolution rate after 2, 8 and 64 days of immersion in saline solution at 90° C. plotted as a function of the measured iron oxide content for the iron phosphate glasses prepared in Example 1.
Figure 3:
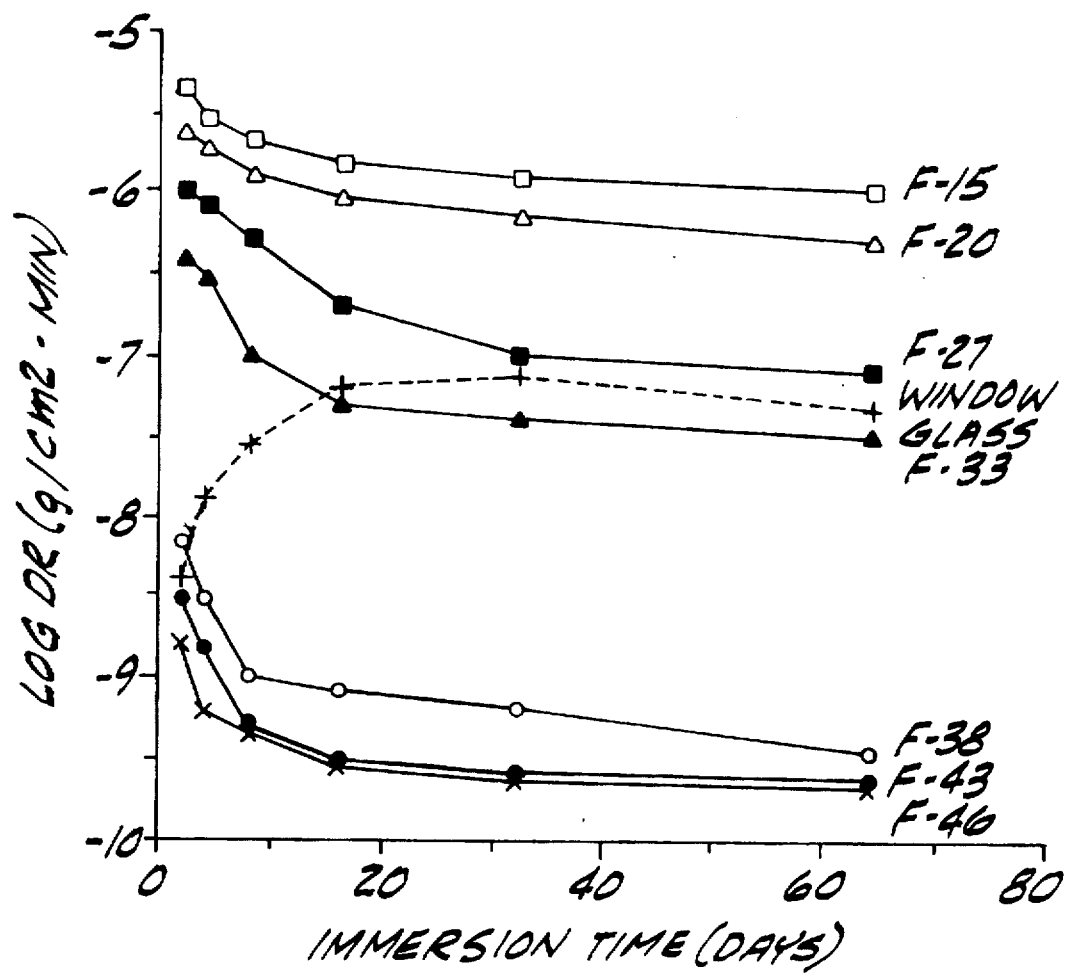
FIG. 3 shows the log of the bulk dissolution rate in distilled water at 90° C. plotted as a function of immersion time for the iron phosphate glasses prepared in Example 1.
Figure 4:
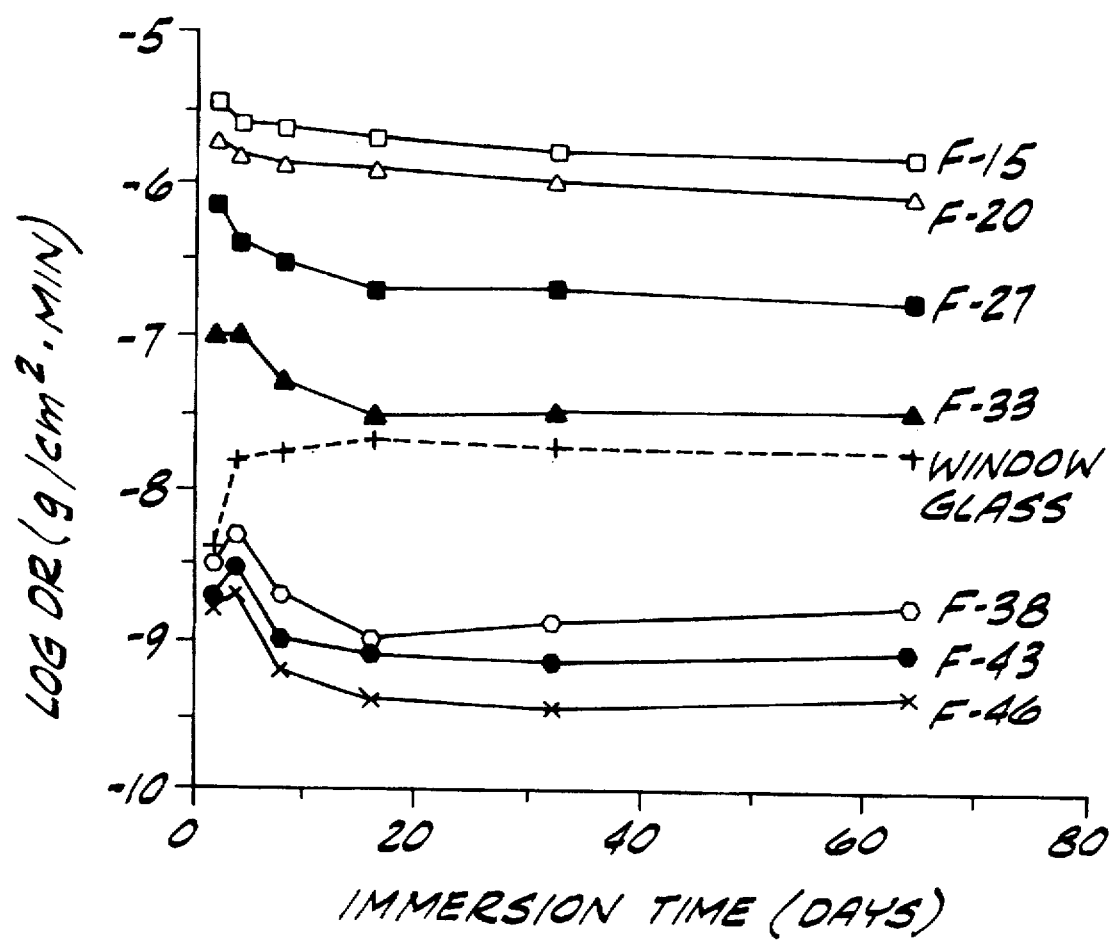
FIG. 4 shows the log of the bulk dissolution rate in saline solution at 90° C. plotted as a function of immersion time for the iron phosphate glasses prepared in Example 1.

The log of the dissolution rate of the seven iron phosphate glasses after 2, 8 and 64 days of immersion is plotted as a function of the measured iron oxide content of the glasses in FIG. 1 (distilled water) and FIG. 2 (saline solution). The log of the dissolution rate of the seven iron phosphate glasses is plotted as a function of the immersion time in FIG. 3 (distilled water) and FIG. 4 (saline solution). As shown in FIGS. 1–4, the dissolution rate of the iron phosphate glasses in both distilled water and in the saline solution at 90° C. varied significantly with iron oxide content. In both cases, the dissolution rate decreased significantly from about $10^{-6}$ g/cm².min to nearly $10^{-10}$ g/cm².min, when the iron oxide content exceeded about 30 weight percent. The iron phosphate glasses containing more than about 30 weight percent iron oxide exhibited a remarkably low dissolution rate in water or saline solution, 50 to 100 times lower than the dissolution rate for window glass at 90° C. after 64 days of immersion (See the dashed lines in FIGS. 1 and 2). As shown in FIGS. 3 and 4, the dissolution rate of these glasses typically decreased by a factor of about ten with increasing immersion time in both distilled water and saline solution.

Further evidence of the relative chemical durability of these iron phosphate glasses was apparent from the visual appearance of the external surface of samples corroded for 64 days in either distilled water or the saline solution. There was no readily detectable difference in appearance for a given glass immersed in either distilled water or the saline solution, but the glasses of lower iron oxide content (e.g., F-15 and F-27) were clearly more heavily corroded than the F-43 glass. The external surface of the F-15 and F-27 samples was rough and heavily pitted. By comparison, the surface of the F-43 samples was smooth, the corners and edges had their original sharpness and the only is detectable evidence of corrosion was a slightly discolored (from black to red/orange) surface.

Mössbauer spectra of samples (ground to —400 mesh powder) of all the glasses in Table 1 except glass F-20 were measured at 295° K. using a constant acceleration spectrometer that utilized a room temperature rhodium-matrix cobalt-57 source and was calibrated at room temperature with natural abundance α-iron foil.

Figure 5:
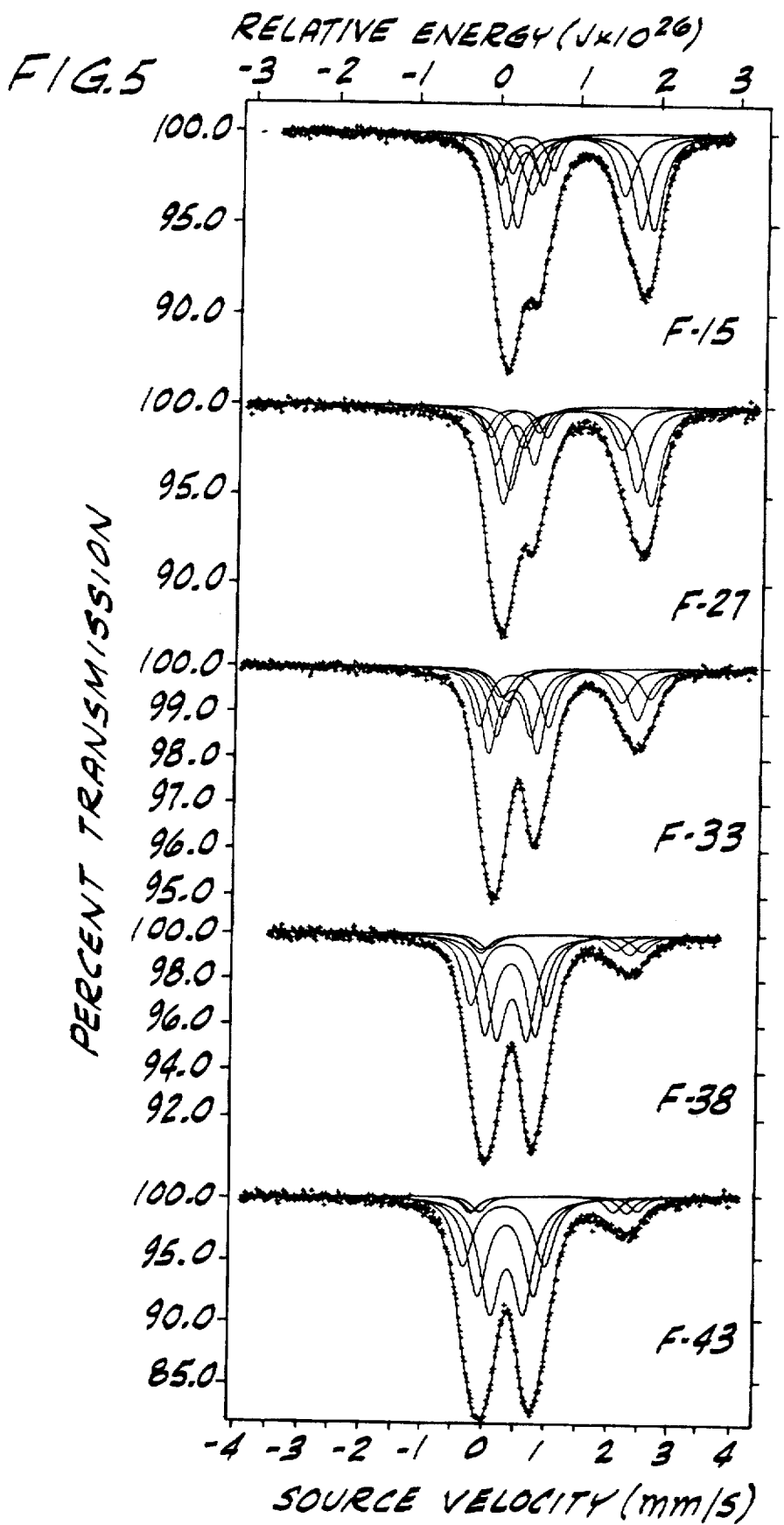
FIG. 5 is the Mössbauer spectra measured at 295° K. for the iron phosphate glasses prepared in Example 1.

The Mössbauer spectra measured at 295° K. for the F-15, F-27, F-33, F-38 and F-43 iron phosphate glasses are shown in FIG. 5 and indicate that each sample contained both $Fe^{2+}$ and $Fe^{3+}$. The F-15 and F-27 glasses contained more $Fe^{2+}$ as indicated by the higher intensity of the absorption at about 2.7 mm/s in FIG. 5, an absorption which is characteristic of high-spin $Fe^{2+}$. In contrast, this absorption is much weaker in the F-38 and F-43 glasses, indicating that these glasses contain relatively little $Fe^{2+}$ and more $Fe^{3+}$.

Figure 7:
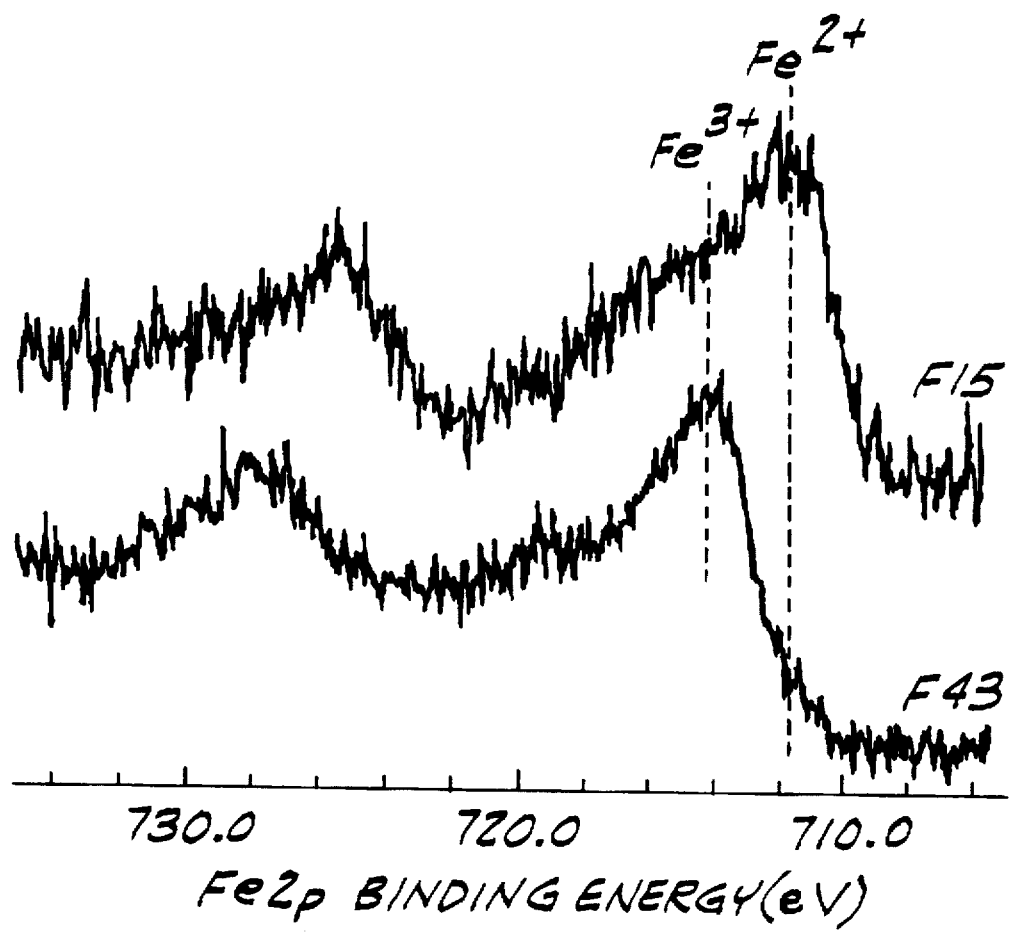
FIG. 7 is the iron 2P X-ray Photoelectron Spectroscopy (XPS) spectra for the F-15 and F-43 iron phosphate glasses prepared in Example 1.

The relative amounts of $Fe^{2+}$ and $Fe^{3+}$ in each glass were calculated from the area of the appropriate peaks in the Mössbauer spectra assuming that the two ions have the same recoil-free fraction. The spectral absorption lines were broad indicating a distribution of hyperfime parameters as would be expected of glasses. This distribution was approximated by using three symmetric quadruple doublets for both the $Fe^{2+}$ and $Fe^{3+}$ sites. The Mössbauer parameters and the calculated percent of iron present as $Fe^{2+}$ and $Fe^{3+}$ for the iron phosphate glasses are summarized in Table 3. Only the area-weighted average hyperfime parameters isomer shift (δ) and quadruple splitting ($\Delta E_Q$) for $Fe^{2+}$ and $Fe^{3+}$ are reported in Table 3.

was fractured in a $<3 \times 10^{-9}$ torr vacuum immediately prior to analysis. The binding energies for the XPS spectra were normalized to the carbon 1s, binding energy of 284.8 eV for adventitious carbon. The iron 2P XPS spectra for the F-15 and F-43 iron phosphate glasses is shown in FIG. 7 and indicates a change from predominately $Fe^{2+}$ to $Fe^{3+}$ with increasing iron oxide content. The $Fe2P_{3/2}$ peak in the F-15 glass (top curve in FIG. 7) is broader and occurs at a lower binding energy than in the F-43 glass. This lower binding energy suggests a lower oxidation state (i.e., $Fe^{2+}$) is predominant in the F-15 glass, whereas $Fe^{3+}$ is predominant in the F-43 glass. Typical binding energies for the $Fe2P_{3/2}$ peak are 709.3 to 710.3 eV in FeO, and 710.3 to 711.5 eV in $Fe_2O_3$.

Figure 8:
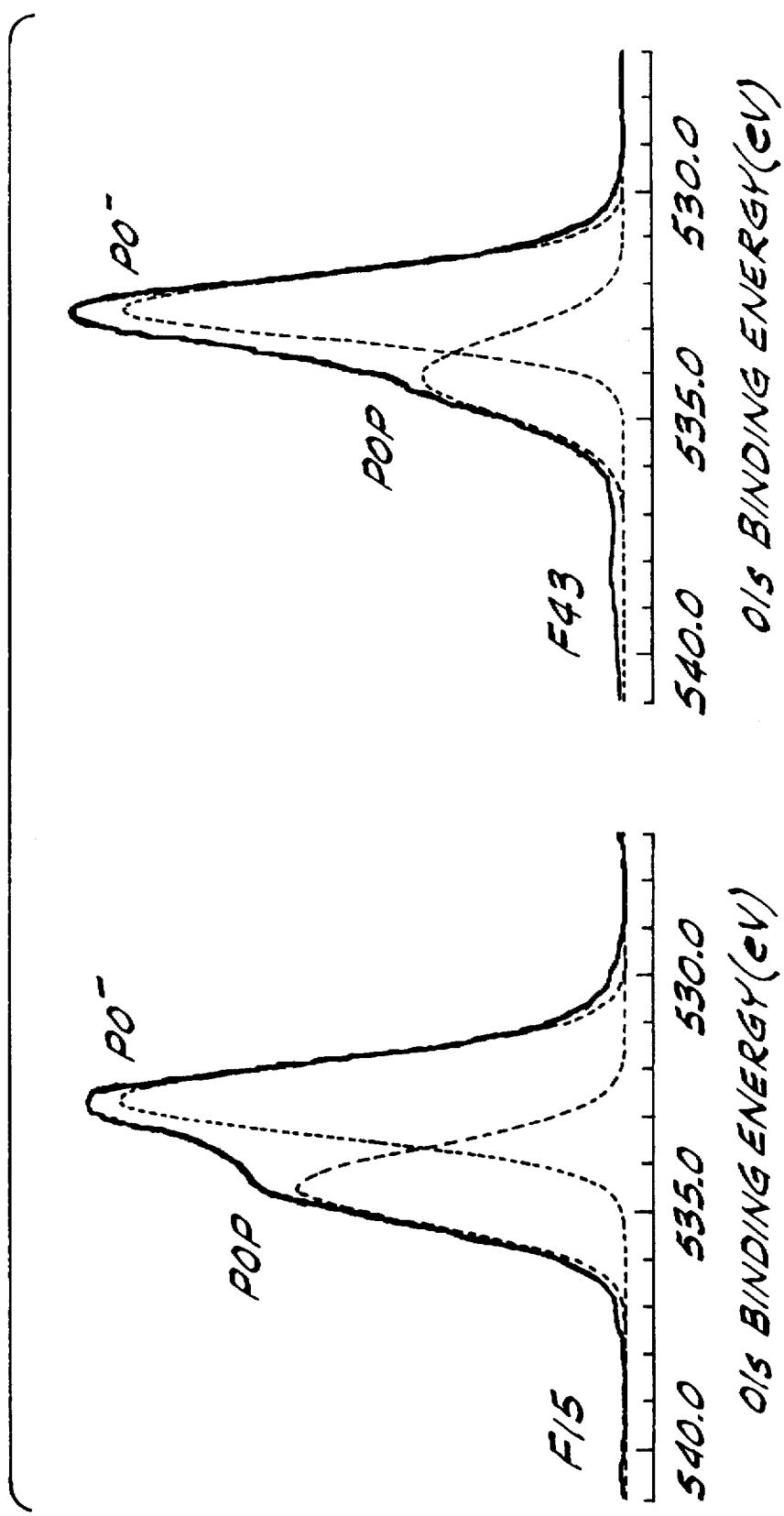
FIG. 8 is the oxygen is X-ray Photoelectron Spectroscopy (XPS) spectra for the F-15 and F-43 iron phosphate glasses prepared in Example 1.

FIG. 8 shows the oxygen 1s spectra for the F-15 and F-43 iron phosphate glasses. Two peaks are clearly evident in the spectra for the F-15 glass, peaks which are due to bridging (−534.3 eV) and nonbridging (−532.7 eV) oxygen ions. In the spectra for the F-43 glass, the peak is primarily due to nonbridging oxygens (P—O—) and the only evidence for bridging oxygens (P—O—P) is a barely detectable shoulder on the high energy side of the larger nonbridging oxygen peak. These binding energies are close to those reported for other phosphate glasses. Decomposition of each spectrum into two gaussian components yields P—O—P to P—O— bonding ratios of is 0.58 to 0.61 for the F-15 glass and 0.13 for the F-43 glass. These results show that the bridging oxygen (P—O—P) bonds are gradually eliminated with increasing iron oxide content and suggest that these bonds are gradually replaced by P—O—$Fe^{2+}$ and P—O—$Fe^{3+}$ bonds.

Figure 9:
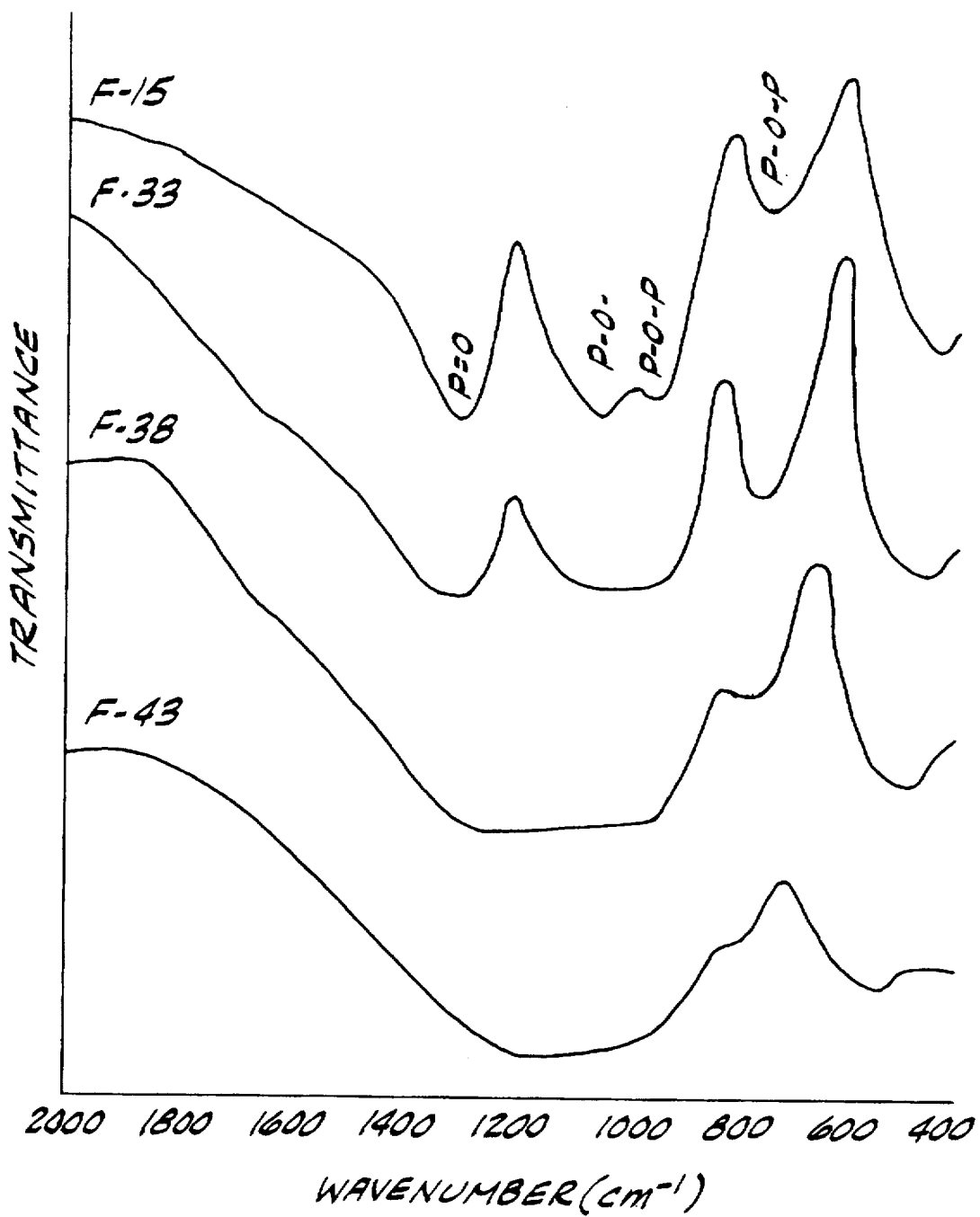
FIG. 9 is the infrared spectra for the iron phosphate glasses prepared in Example 1.

The infrared spectra for the F-15, F-33, F-38 and F-43 iron phosphate glasses are shown in FIG. 9. With increasing iron oxide content, the individual absorption lines attributed to P=O and P—O—P bonds become less well resolved, a change which is consistent with the XPS spectra. That is, the decrease in the intensity of the P—O—P stretching bonds with increasing iron oxide content shown in FIG. 9 is consistent with the P—O—P bonds being replaced by P—O—$Fe^{2+}$ and P—O—$Fe^{3+}$ bonds. The lower thermal expansion coefficient, higher dilatometric softening temperature, and improved chemical durability of the glasses having increased iron oxide content suggest that the P—O—Fe bonds are stronger than the P—O—P bonds they replace in the phosphorus-oxygen network.

TABLE 3

| | $Fe^{2+}$ | | | | $Fe^{3+}$ | | | |
|---|---|---|---|---|---|---|---|---|
| Code | δ (mm/s) | $\Delta E_Q$ (mm/s) | Γ (mm/s) | % $Fe^{2+}$ | δ (mm/s) | $\Delta E_Q$ (mm/s) | Γ (mm/s) | % $Fe^{3+}$ |
| F-15 | 1.30 | 2.01 | 0.36 | 73.5 | 0.39 | 0.70 | 0.26 | 26.5 |
| F-27 | 1.30 | 2.10 | 0.38 | 71.8 | 0.34 | 0.76 | 0.29 | 28.2 |
| F-33 | 1.28 | 2.13 | 0.38 | 40.4 | 0.38 | 0.81 | 0.32 | 59.6 |
| F-38 | 1.13 | 2.35 | 0.37 | 17.4 | 0.41 | 0.80 | 0.35 | 82.6 |
| F-43 | 1.10 | 2.44 | 0.31 | 12.5 | 0.40 | 0.86 | 0.38 | 87.5 |
| F-46 | 1.09 | 2.39 | 0.34 | 13.0 | 0.39 | 0.80 | 0.39 | 87.0 |

Figure 6:
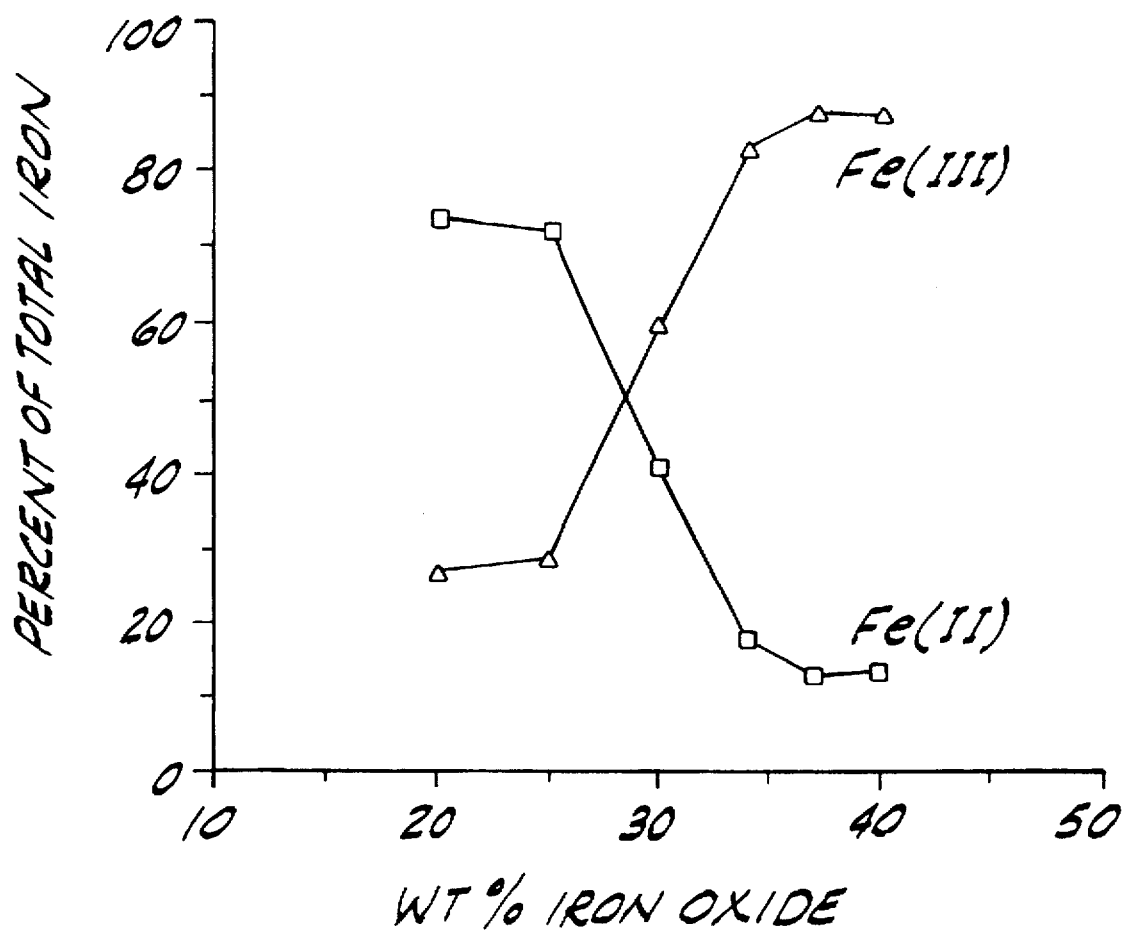
FIG. 6 shows the percent of iron in the glasses prepared in Example 1 present as $Fe^{2+}$ and $Fe^{3+}$ as calculated from the Mössbauer spectra measured at 295° K. plotted as a function of the iron oxide content of the glasses.

In FIG. 6, the percent of iron in the iron phosphate glasses present as $Fe^{2+}$ and $Fe^{3+}$ as calculated from the Mössbauer spectra measured at 295° K. is plotted as a function of the iron oxide content. Based upon the Mössbauer spectral results, the proportion of $Fe^{2+}$ and $Fe^{3+}$ in these glasses changed rapidly at about 30 weight percent iron oxide, a change which is illustrated in FIG. 6.

The iron and oxygen X-ray Photoelectron Spectroscopy (XPS) spectra of the F-15 and F-43 glasses were also measured using a Kratos XSAM 800 spectrometer with 225 W Mg-Kα x-ray as the excitation radiation. Each sample These iron phosphate glasses have a remarkably good chemical durability in distilled water and in saline solution at 90° C. The dissolution rate of $10^{-9}$ g/cm².min at 90° C. exhibited by glasses containing more than about 30 weight percent iron oxide is comparable to, and in some cases, better than that of many silicate glasses. The large decrease in the dissolution rate occurring at about 30 weight percent iron oxide shown in FIGS. 1–4 and the increase in $Fe^{3+}$ content shown in FIG. 6 suggests that the absolute quantity of iron oxide in the iron phosphate glass and the fraction of total iron present as $Fe^{3+}$ are both important factors in the chemical durability exhibited by the glass. The optimum glass composition in terms of durability and glass forming tendency seems to be located close to the composition for ferric pyrophosphate $Fe_4(P_2O_7)_3$ which stoichiometrically contains about 43 weight percent $Fe_2O_3$.

EXAMPLE 2

In this Example, several iron phosphate glasses were prepared from various batch materials to determine the effect of the selection of batch materials on the oxidation state of iron present in the glasses and how the properties of the glasses varied with the oxidation state of the iron.

The batch materials used to prepare the iron phosphate glasses were selected from reagent grade $P_2O_5$, $Fe_2O_3$, $NH_4H_2PO_4$ and $Fe_4(P_2O_7)_3$. The $Fe_4(P_2O_7)_3$ reagent contained 6 to 7 weight percent $Na_2O$ as an impurity. Selected batch materials were dry mixed as powders and melted for 1 to 2 hours at temperatures between 1050° and 1200° C. in a high-purity, alumina crucible and an air atmosphere using an electric furnace. The bubble free melts were cast into a rectangular steel mold (1×1×15 cm), annealed at 450° to 500° C. for 1 to 2 hours, and then slowly cooled to room temperature to yield rectangular glass bars approximately 100 g in weight. The composition of the glasses was determined by EDAX analysis as described in Example 1.

Figure 10:
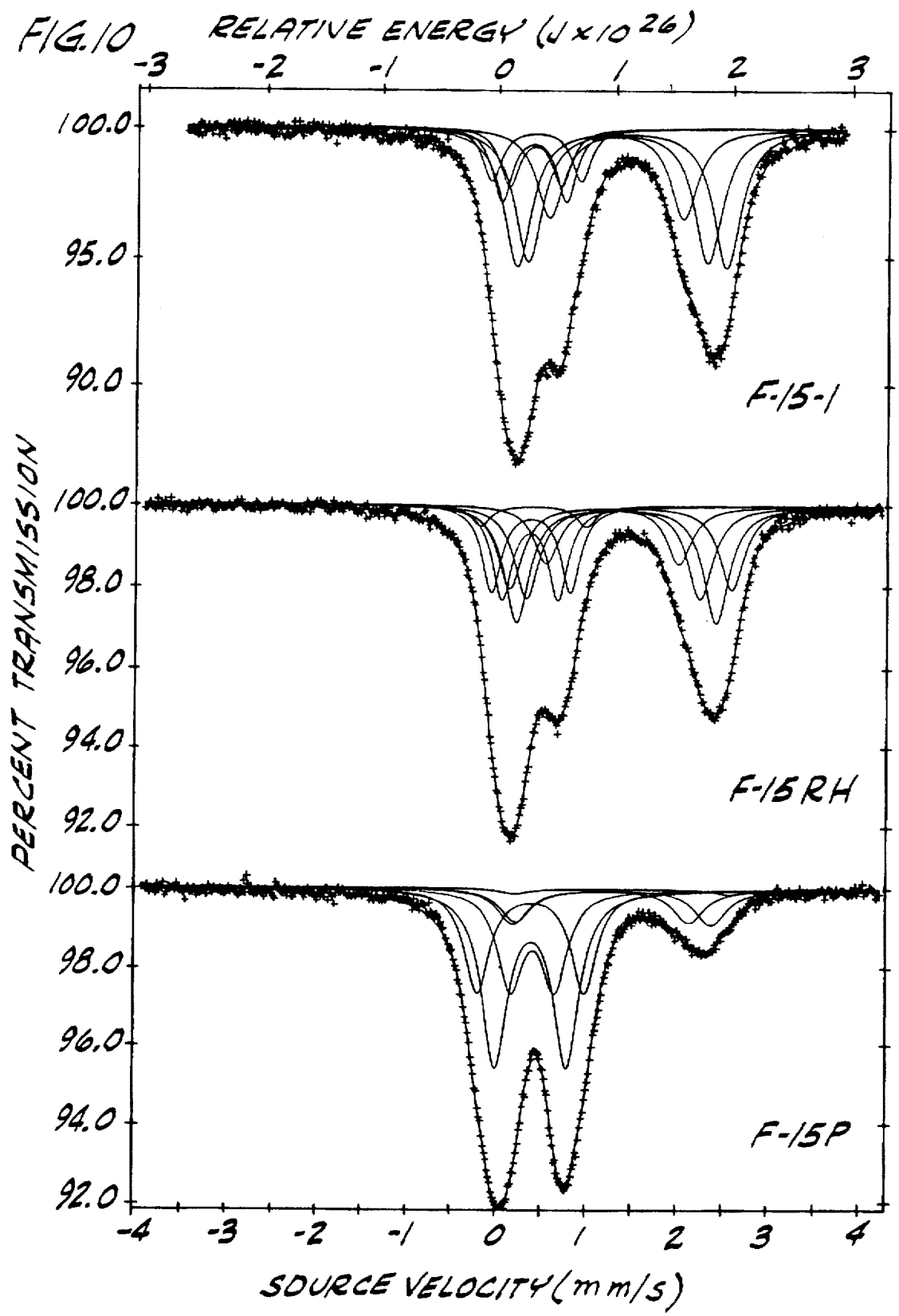
FIG 10 is the Mössbauer spectra measured at 295° K. for the three F-15 iron phosphate glasses prepared in Example 2.
Figure 11:
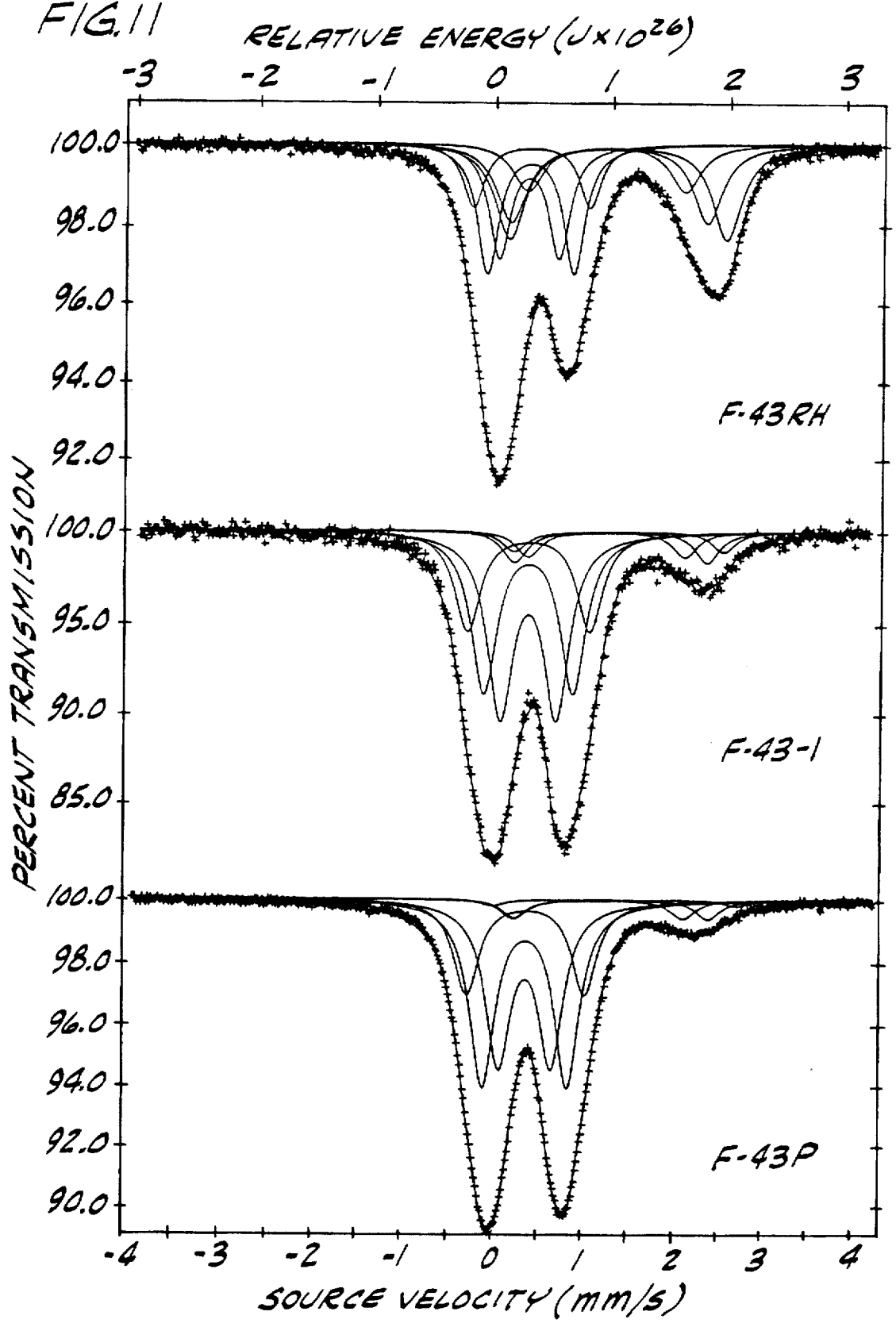
FIG. 11 is the Mössbauer spectra measured at 295° K. for the three F-43 iron phosphate glasses prepared in Example 2.

The compositions of the batch mixtures and of the iron phosphate glasses as determined by EDAX, rounded to the nearest 0.1 weight percent, are summarized in Table 4. The estimated error in the reported EDAX values is ±4 weight percent.

glasses as $Fe^{2+}$ and $Fe^{3+}$ as described in Example 1. The Mössbauer spectra measured at 295° K. for the three F-15 and three F-43 iron phosphate glasses listed in Table 4 are shown in FIGS. 10 and 11, respectively. The isomer shift (δ) and quadruple splitting ($\Delta E_Q$) for $Fe^{2+}$ and $Fe^{3+}$ was calculated from the measured spectra. The relative amounts of $Fe^{2+}$ and $Fe^{3+}$ in each glass was calculated from the area of the appropriate peaks in the Mössbauer spectra. The Mössbauer parameters and the calculated percent of iron present as $Fe^{2+}$ and $Fe^{3+}$ for the iron phosphate glasses are summarized in Table 5. The values for δ and $\Delta E_Q$ are area weighted averages.

TABLE 5

| | $Fe^{2+}$ | | | | $Fe^{3+}$ | | | |
|---|---|---|---|---|---|---|---|---|
| Code | δ (mm/s) | $\Delta E_Q$ (mm/s) | Γ (mm/s) | % $Fe^{2+}$ | δ (mm/s) | $\Delta E_Q$ (mm/s) | Γ (mm/s) | % $Fe^{3+}$ |
| F-15-1 | 1.30 | 2.01 | 0.36 | 73.5 | 0.39 | 0.70 | 0.26 | 26.5 |
| F-15RH | 1.31 | 2.07 | 0.33 | 68.9 | 0.36 | 0.78 | 0.26 | 31.1 |
| F-15P | 1.25 | 2.08 | 0.43 | 20.2 | 0.40 | 0.82 | 0.34 | 79.8 |
| F-43-1 | 1.10 | 2.44 | 0.31 | 12.5 | 0.40 | 0.86 | 0.38 | 87.5 |
| F-43RH | 1.28 | 2.18 | 0.41 | 51.0 | 0.36 | 0.92 | 0.29 | 49.0 |
| F-43P | 1.25 | 2.12 | 0.34 | 9.2 | 0.36 | 0.89 | 0.37 | 90.8 |

Samples of the iron phosphate glasses were cut from the annealed bars for property measurements. The surfaces of the samples were ground and polished to 600-grit. The density, thermal expansion coefficient (α) and dilatometric softening temperature ($T_d$) were measured as described in Example 1. The values for these measured properties along with the percent of iron present as $Fe^{2+}$ and $Fe^{3+}$ as calculated from the Mössbauer spectrum at 295° K. for the iron phosphate glasses listed in Table 4 are summarized in Table 6. The estimated errors in the measured density and softening temperature are ±0.005 g/cm³ and ±5° C., respectively. The value of the thermal expansion coefficient reported in Table 6 is the average between 25° and 300° C. and has an estimated error is $\pm 5 \times 10^{-7}$/°C.

TABLE 4

| | Composition (wt %) | | | | | | | |
|---|---|---|---|---|---|---|---|---|
| | Batch Composition | | | | Analyzed EDAX Composition | | | |
| Code | $Fe_2O_3$ | $P_2O_5$ | $Fe_4(P_2O_7)_3$ | $NH_4H_2PO_4$ | iron oxide | $P_2O_5$ | $Na_2O$ | $Al_2O_3$ |
| F-15-1 | 0.0 | 0.0 | 25.0 | 75.0 | 20.0 | 78.0 | 2.0 | nm |
| F-15RH | 9.8 | 0.0 | 0.0 | 90.2 | 26.1 | 73.2 | 0.0 | 0.7 |
| F-15P | 15.0 | 85.0 | 0.0 | 0.0 | 27.2 | 71.5 | 0.0 | 1.4 |
| F-43-1 | 0.3 | 0.0 | 99.7 | 0.0 | 37.0 | 57.0 | 6.0 | nm |
| F-43RH | 31.8 | 0.0 | 0.0 | 68.2 | 36.9 | 63.1 | 0.0 | nm |
| F-43P | 43.0 | 57.0 | 0.0 | 0.0 | 38.2 | 61.2 | 0.0 | 0.6 |

As shown in Table 4, EDAX analysis of the glasses indicated that they contained less than about 1.5 weight percent $Al_2O_3$ dissolved from the alumina crucible. Comparison of the batch and glass compositions indicates that about 15 percent of the $P_2O_5$ in the batch used to prepare the glass designated F-15P evaporated from the melt during heating.

The Mössbauer spectrum of the glasses was measured and used to determine the proportion of iron present in the

TABLE 6

| Code | Density (g/cm³) | α (1 × 10⁻⁷/°C. | $T_d$ (°C.) | % $Fe^{2+}$ | % $Fe^{3+}$ |
|---|---|---|---|---|---|
| F-15-1 | 2.78 | 117 | 450 | 73.5 | 26.5 |
| F-15RH | 2.79 | 115 | 455 | 68.9 | 31.1 |
| F-15P | 2.95 | 105 | 465 | 20.2 | 79.8 |
| F-43-1 | 3.04 | 77 | 502 | 12.5 | 87.5 |

TABLE 6-continued

| Code | Density (g/cm$^3$) | α (1 × 10$^{-7}$/°C.) | T$_d$ (°C.) | % Fe$^{2+}$ | % Fe$^{3+}$ |
|---|---|---|---|---|---|
| F-43RH | 2.96 | 88 | 495 | 51.0 | 49.0 |
| F-43P | 3.05 | 70 | 505 | 9.2 | 90.8 |

The Mössbauer spectra and parameters measured for the six iron phosphate glasses listed in Table 4 show that these glasses contain varying amounts of Fe$^{2+}$ and Fe$^{3+}$, depending upon the batch materials used to prepare the glass. The glasses made with NH$_4$H$_2$PO$_4$ as the source of P$_2$O$_5$ (i.e., F-15-1, F-15RH and F-43RH) contained the largest amounts of Fe$^{2+}$. By contrast, when the batch materials were P$_2$O$_5$ and Fe$_2$O$_3$, the glasses (i.e., F-15P and F-43P) contained approximately 80 to 90 percent Fe$^{3+}$. It is believed that ammonia released from NH$_4$H$_2$PO$_4$ creates reducing conditions during the glass forming process that reduced up to about 70 percent of the Fe$^{3+}$ in the batch materials to Fe$^{2+}$ in the glass (See F-15RH and F-43RH). Furthermore, the effect of NH$_4$H$_2$PO$_4$ as a reducing agent is more pronounced in the glasses containing smaller amounts of iron oxide (compare F-15RH to F-43RH). As indicated by their lower Fe$^{2+}$ content of about 10 to about 20 percent, the glasses made from Fe$_4$(P$_2$O$_7$)$_3$ or with Fe$_2$O$_3$ and P$_2$O$_5$ were prepared under more oxidizing conditions. However, even with these raw materials, about 10 to about 20 percent of the Fe$^{3+}$ initially present in the batch materials was reduced to Fe$^{2+}$ when the batch was melted in an air atmosphere at 1100° to 1200° C.

As in Example 1, the density and dilatometric softening temperature of the iron phosphate glasses increased linearly and the thermal expansion coefficient decreased linearly as the iron oxide content of the glass increased (compare the F-15 glasses to the F-43 glasses). These three properties were also dependent upon the oxidation state of the iron in the glass. Both density and dilatometric softening temperature increased as the proportion of iron present in the glass as Fe$^{3+}$ increased, while increasing the proportion of iron present as Fe$^{3+}$ was accompanied by a reduction in the thermal expansion coefficient of about 10 to about 20 percent.

Figure 12:
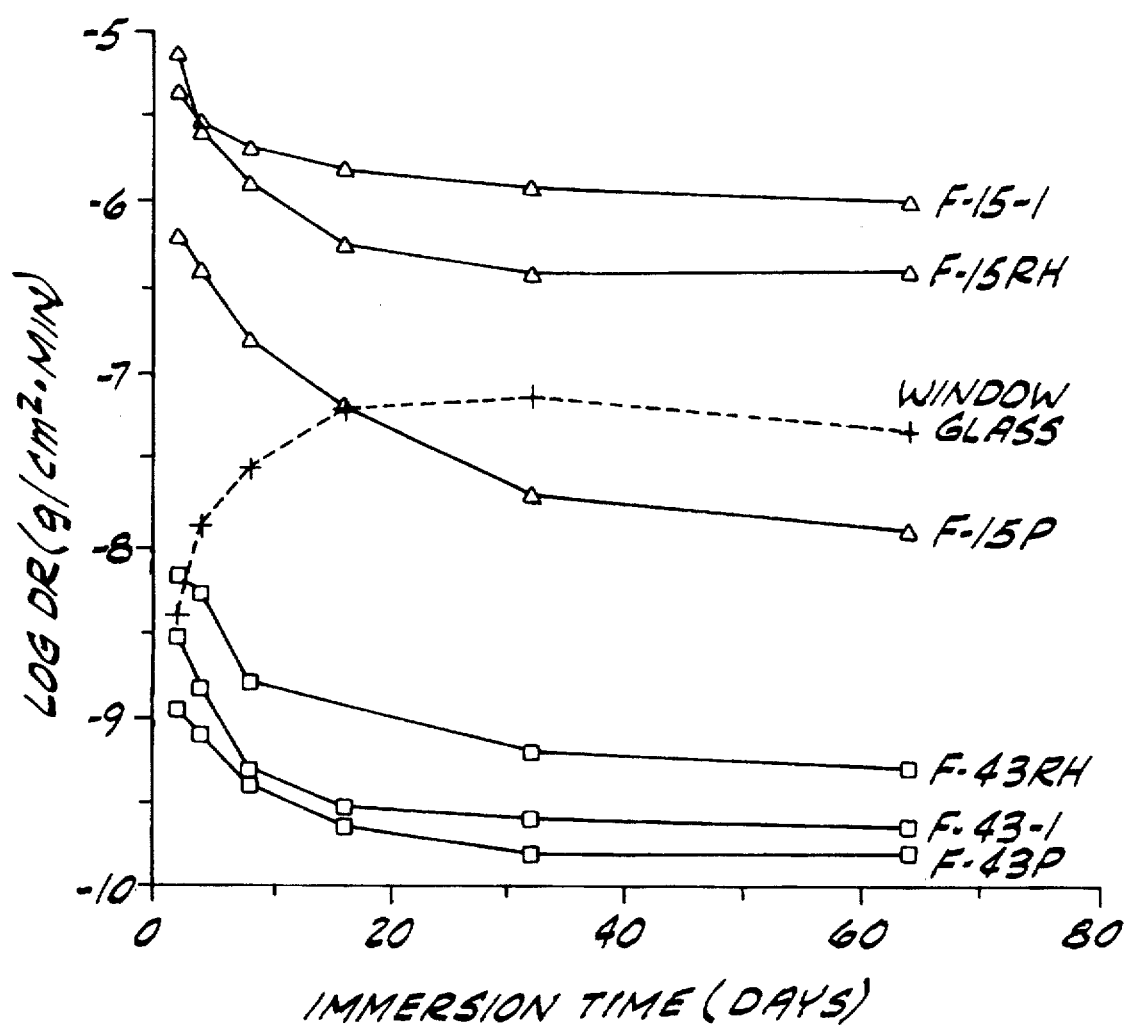
FIG. 12 shows the log of the bulk dissolution rate in distilled water at 90° C. plotted as a function of immersion time for the iron phosphate glasses prepared in Example 2.

The effect of the oxidation state of the iron on the chemical durability of the six glasses listed in Table 4 was assessed by measuring the dissolution rate of the glasses in distilled water at 90° C. as described in Example 1. FIG. 12 shows the time dependence of the dissolution rate in distilled water at 90° C. for the six iron phosphate glasses listed in Table 4.

The dissolution rate for each glass decreased by about a factor of 10 with increasing time in distilled water. This suggests that a chemically-protective layer forms on the glass as the immersion time increases. As illustrated in FIG. 12, the three F-43 iron phosphate glasses having higher iron oxide content had a significantly smaller dissolution rate than the three F-15 glasses having lower iron oxide content. The dissolution rate for the F-43 glasses for periods greater than about 8 days is about 100 times smaller than the dissolution rate for ordinary window glass. Clearly, the chemical durability of the iron phosphate glasses improved significantly with increasing iron oxide content.

Figure 13:
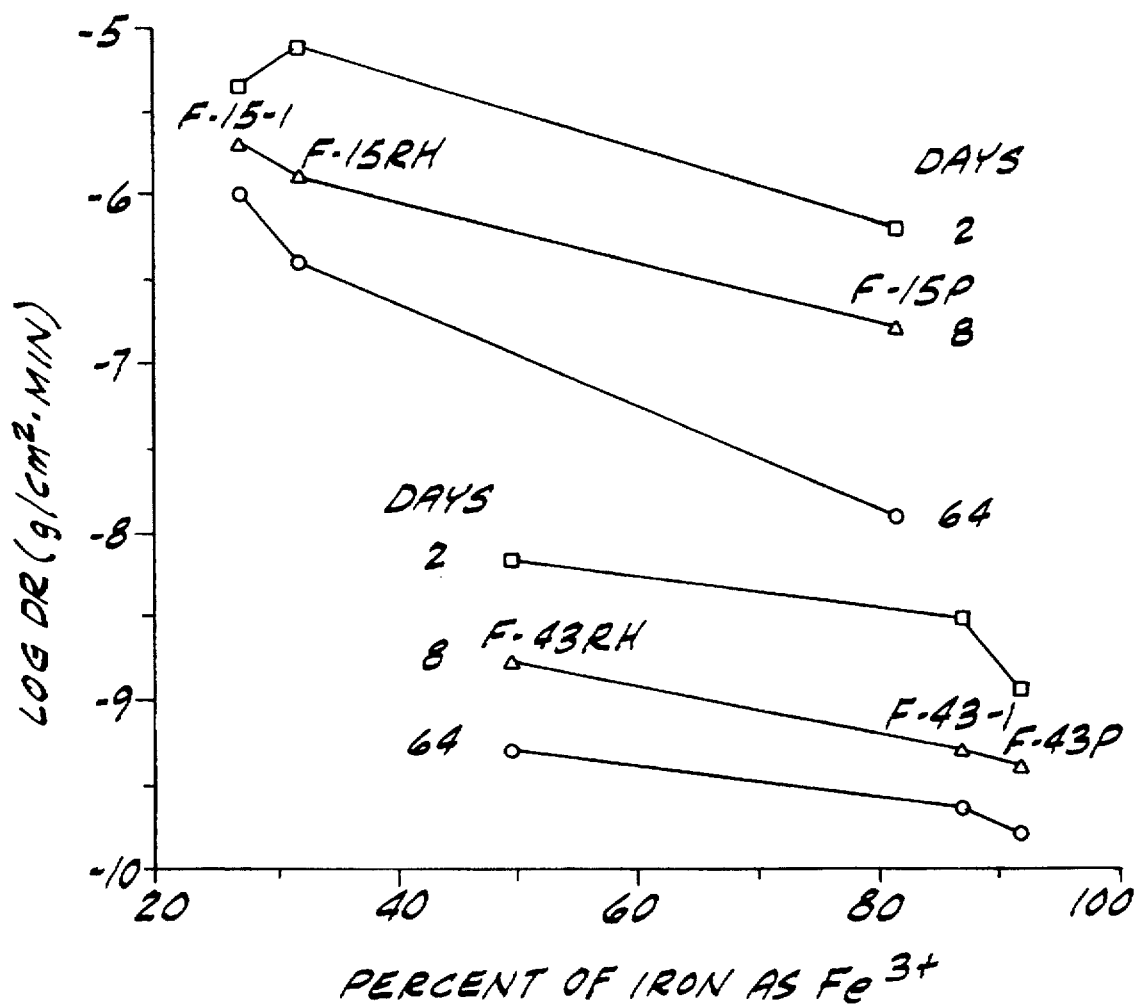
FIG. 13 shows the log of the bulk dissolution rate in distilled water at 90° C. after 2, 8 and 64 days of immersion for the iron phosphate glasses prepared in Example 2 plotted as a function of the percentage of iron in the glasses present as $Fe^{3+}$ as calculated from the Mössbauer spectra measured at 295° K.

FIG. 13 shows the dependence of the dissolution rate of the six iron phosphate glasses listed in Table 4 on the proportion of iron present in the glass as Fe$^{3+}$ for three arbitrarily chosen time periods (2, 8 and 64 days). The results, especially for the three F-15 glasses, clearly show that the iron oxidation state is important to the overall dissolution rate, with the dissolution rate decreasing (i.e., the chemical durability improving) as the percentage of Fe$^{3+}$ in the glass increases. As shown in FIG. 13, at 64 days, the dissolution rate for the F-15 glasses decreased by nearly a factor of 100 as the Fe$^{3+}$ content increased from about 25 percent in the F-15-1 glass to about 80 percent in the F-15P glass. The dissolution rate data for the iron phosphate glasses in FIGS. 12 and 13 is indicative of the chemical durability of an iron phosphate waste form in accordance with the present invention containing a small quantity of metal waste (e.g., less than about 2 weight percent) such as cesium and strontium.

While the compositions varied somewhat, the differences in properties among the three F-15 glasses and among the three F-43 glasses listed in Table 4 are largely attributed to the amount of Fe$^{2+}$ and Fe$^{3+}$ present in these glasses. The reduction in thermal expansion coefficient and dissolution rate coupled with the increase in density and softening temperature with increasing Fe$^{3+}$ content are consistent with the interpretation that Fe$^{3+}$ strengthens the network of these iron phosphate glasses by forming P—O—Fe$^{3+}$ bonds.

The lower dissolution rate for the higher iron content F-43 glasses demonstrates that chemical durability is improved with increasing iron oxide content. However, the results from this Example show that the oxidation state of the iron present in the glass is also an important factor in chemical durability. For any given iron oxide content, the proportion of iron present as Fe$^{3+}$ should be as high as possible in order to maximize chemical durability of an iron phosphate glass. This improvement in chemical durability with Fe$^{3+}$ content can be explained by P—O—P bonds being replaced by more chemically resistant Fe$^{3+}$—O—P bonds.

EXAMPLE 3

In this Example, five iron phosphate glasses were prepared from identical batch mixtures using varying melting temperatures and concentrations of oxygen in the melting atmosphere to deteroxidation effect of these variables on the oxidation state of iron present in the glasses.

Each of the iron phosphate glasses in this Example were prepared from binary mixtures containing approximately 43 weight percent Fe$_2$O$_3$ and 57 weight percent P$_2$O$_5$. The five iron phosphate glasses were prepared as described in Example 1 except that four of the batch mixtures were melted in an air atmosphere at 1000° C., 1050° C., 1100° C. and 1150° C., respectively and the remaining batch mixture was melted in a substantially pure oxygen atmosphere at 1100° C.

The Mössbauer spectrum of the glasses was measured at 295° K. and used to determine the proportion of iron present in the glasses as Fe$^{2+}$ and Fe$^{3+}$ as described in Example 1. The melt temperature, melt atmosphere and the calculated percent of iron present as Fe$^{2+}$ and Fe$^{3+}$ for the five iron phosphate glasses are summarized in Table 7.

TABLE 7

| Code | Melt Temperature (°C.) | Melt Atmosphere | % Fe$^{2+}$ | % Fe$^{3+}$ |
|---|---|---|---|---|
| F43-1 | 1000 | Air | 5.6 | 94.4 |
| F43-2 | 1050 | Air | 8.5 | 91.5 |
| F43-3 | 1100 | Air | 10.8 | 89.2 |

TABLE 7-continued

| Code | Melt Temperature (°C.) | Melt Atmosphere | % $Fe^{2+}$ | % $Fe^{3+}$ |
|---|---|---|---|---|
| F43-4 | 1150 | Air | 12.5 | 87.5 |
| F43-5 | 1100 | Oxygen | 3.9 | 96.1 |

The Mössbauer spectra and parameters measured for the iron phosphate glasses listed in Table 7 indicate that these glasses contain varying amounts of $Fe^{2+}$ and $Fe^{3+}$ depending upon both the temperature used to prepare the melt and the melt atmosphere. By decreasing the temperature used to prepare the melt and increasing the oxygen content of the melt atmosphere, the proportion of iron present in the glass as $Fe^{3+}$ is increased.

EXAMPLE 4

In this Example, waste forms were prepared by heating a batch mixture containing an iron phosphate host glass frit and a simulated waste mixture having a composition representative of a typical low level radioactive waste. The chemical durability of the host glasses and the waste forms was assessed. In some instances, a portion of the $Fe_2O_3$ content of the host glass was replaced by $CaF_2$ to determine the effect of halide addition on chemical durability.

The simulated waste mixture contained $NaNO_3$, $Al_2O_3$, $AlPO_4$, $KNO_3$, $Na_2SO_4$, NaF and $SiO_2$. The oxide composition of the waste mixture is set forth below in Table 8. This waste is an average composition for some of the nuclear wastes presently located in storage facilities at Hanford, Wash. It was used because of its high soda ($Na_2O$) and $P_2O_5$ content which imposes limits on its disposal in borosilicate type glasses.

TABLE 8

| Oxide | Composition (wt %) |
|---|---|
| $Na_2O$ | 83.7 |
| $Al_2O_3$ | 6.4 |
| $P_2O_5$ | 5.3 |
| $K_2O$ | 1.5 |
| $SO_3$ | 1.4 |
| $SiO_2$ | 0.7 |
| F | 1.0 |

Three iron phosphate host glasses were prepared as described in Example 1. The composition of the three batch mixtures used to prepare the host glasses is set forth below in Table 9.

TABLE 9

| | Batch Composition (wt %) | | |
|---|---|---|---|
| Code | $Fe_2O_3$ | $P_2O_5$ | $CaF_2$ |
| F43 | 43 | 57 | 0 |
| F43CF-1 | 33 | 57 | 10 |
| F43CF-2 | 28 | 57 | 15 |
| F43CF-3 | 23 | 57 | 20 |

After melting and quenching the iron phosphate glasses, they were ground to a fine powder frit. The powdered glass was then combined with the simulated waste to produce a 200 g batch mixture for preparing waste forms designated F43W, F43WCF-1, F43WCF-2, F43WCF-3 and F43WCF-1-1. The batch mixture for waste forms F43W, F43WCF-1 and F43WCF-3 contained 40 weight percent of the waste mixture (on an oxide basis) and 60 weight percent of the F43, F43CF-1 and F43CF-3 glass frits, respectively. The batch mixture for waste form F43WCF-1-1 contained 30 weight percent of the waste mixture and 70 weight percent of the F43CF-1 glass frit. The oxide composition of the waste form batch mixtures is set forth below in Table 10.

TABLE 10

| | Batch Composition (wt %) | | | | | | | | |
|---|---|---|---|---|---|---|---|---|---|
| Code | $Na_2O$ | $Al_2O_3$ | $Fe_2O_3$ | $P_2O_5$ | $K_2O$ | $SiO_2$ | $SO_3$ | F | $CaF_2$ |
| F43W | 18.30 | 1.40 | 33.60 | 45.72 | 0.33 | 0.16 | 0.29 | 0.22 | 0.00 |
| F43WCF-1 | 18.04 | 1.37 | 25.88 | 45.85 | 0.33 | 0.16 | 0.29 | 0.23 | 7.84 |
| F43WCF-3 | 18.04 | 1.37 | 18.04 | 45.85 | 0.33 | 0.16 | 0.29 | 0.23 | 15.69 |
| F43WCF-1-1 | 12.56 | 0.97 | 28.04 | 49.23 | 0.21 | 0.11 | 0.21 | 0.15 | 8.50 |

The 200 g batch mixtures were preheated for one hour in a high purity alumina crucible at 160° C. followed by one hour at 512° C. using an electric furnace. The preheated batch mixtures were then melted for 1 to 2 hours at about 1100° C. in an air atmosphere. The melts were stirred approximately every 15 minutes. A substantial fraction of the total weight of the waste was lost during melting, due primarily to nitrate decomposition as the components of the waste mixture were converted to oxides. The melts were cast into an iron mold, annealed at 450° C. for about 30 minutes and then slowly cooled in the annealing furnace to room temperature to provide the waste forms.

The chemical durability of the some of the host glasses and the waste forms was assessed by measuring their bulk dissolution rate in distilled water. The bulk dissolution rate of the host glasses and the waste forms was measured using a procedure similar to that described in the preceding Examples. In this Example, multiple rectangular samples having a surface area between about 3 and about 5 $cm^2$ were cut from the host glasses and waste forms and polished with 240 grit silicon carbide paper using oil as a cooling medium. The polished samples were rinsed in acetone and oven dried at 110° C. for approximately 1 hour before being cooled in a desiccator. After weighing and measuring their dimensions, the dried samples were hung in a glass erlenmeyer flask which contained 100 ml of distilled water at 90° C. The samples were hung using plastic thread. The flask was then placed in a constant-temperature oven at 90° C. The weight (±0.01 mg) of each sample was measured periodically after 1, 3, 7 and 14 days of immersion in distilled water. To determine the weight of a sample, the sample was removed from the solution, rinsed in acetone and oven dried at 110° C. for approximately 1 hour before being cooled in a desiccator and weighed. The bulk dissolution rate in g/cm².min for the samples was calculated using the equation set forth in Example 1. Fresh distilled water was used after each weight measurement. The measured bulk dissolution rates of selected host glasses and the waste forms containing simulated waste are set forth below in Table 11. In the case of the waste form designated F43W, there was no measured weight loss. The bulk dissolution rate for the F43W waste form in Table 11 was calculated based on the weighing error of the balance.

TABLE 11

| Code | Trial | Surface Area (cm²) | Dissolution Rate ($1 \times 10^{-8}$ g/cm² · min) | | | |
|---|---|---|---|---|---|---|
| | | | 1 Day | 3 Days | 7 Days | 14 Days |
| F43CF-1 | 1 | 4.35 | 0.16 | 0.05 | 0.02 | nm |
| | 2 | 3.63 | 0.19 | 0.06 | 0.08 | nm |
| F43CF-2 | 1 | 4.72 | 1.03 | 0.54 | 0.25 | nm |
| | 2 | 4.12 | 1.18 | 0.67 | 0.37 | nm |
| F43CF-3 | 1 | 4.84 | 2.87 | 1.05 | 0.51 | nm |
| | 2 | 4.52 | 0.92 | 0.67 | 0.31 | nm |
| F43W | 1 | 5.43 | 14.1 | 10.7 | 7.31 | 5.48 |
| | 2 | 5.79 | 12.0 | 8.4 | 6.00 | 5.05 |
| F43WCF-1 | 1 | 4.70 | nm | 0.49 | 0.27 | nm |
| | 2 | 4.59 | nm | 0.45 | 0.28 | nm |
| | 3 | 4.14 | 3.86 | 2.18 | 1.01 | 0.56 |
| | 4 | 3.63 | 4.02 | 2.17 | 1.01 | 0.52 |
| F43WCF-3 | 1 | 4.66 | nm | 0.50 | 0.28 | nm |
| | 2 | 4.06 | nm | 1.37 | 0.73 | nm |
| F43WCF-1-1 | 1 | 4.61 | 0.75 | 0.50 | 0.58 | 0.33 |
| | 2 | 4.04 | 3.61 | 1.43 | 0.96 | 0.58 |

Three rectangular samples of the waste form designated F43WCF-1 were crystallized by heating the samples at elevated temperatures. The bulk dissolution rate of the crystallized samples was measured using the procedure described above. The measured surface area and bulk dissolution rates for the three crystallized samples are set forth below in Table 12.

TABLE 12

| Trial | Surface Area (cm²) | Dissolution Rate ($1 \times 10^{-8}$ g/cm² · min) | | | |
|---|---|---|---|---|---|
| | | 1 Day | 3 Days | 7 Days | 14 Days |
| 1 | 3.28 | 8.47 | 5.15 | 5.11 | 3.89 |
| 2 | 3.74 | 26.7 | 14.3 | 8.41 | 5.54 |
| 3 | 4.70 | 26.7 | 14.8 | 8.61 | 5.66 |

The dissolution rate in deionized water of particles of the waste form designated F43WCF-1 was also measured. The particle dissolution test is a more severe test of chemical durability than the previously described bulk dissolution test because a greater proportion of the samples surface area is exposed to the dissolution solvent. Samples of this waste form were crushed into particles which passed a 100 mesh screen (−100 mesh) and were retained on a 200 mesh screen (+200 mesh) and washed following the Product Consistency Test (PCT) procedure described in ASTM C1285-94. Duplicate samples (3.0 g±0.0004 g) of the crushed waste form were placed in 60 ml Teflon bottles containing 30 ml of deionized water (18.2 MΩ) at 90° C. The bottles were then placed in a constant-temperature oven at 90° C. After 7 days of immersion, the weight of the glass particles was remeasured and the dissolution rate (DR) was calculated using the equation DR=ΔW/(A×t), where ΔW is the weight change (g), A is the surface area of the crushed sample (cm²), and t is the immersion time (10,080 min.). Assuming that the particles were essentially spherical, the surface area (A) of the crushed sample (522 cm²) was calculated using the equation (3.0 g×6)/(D×d), where D is the density of the waste form and d is the arithmetic average diameter of the particles (112.5 μm). The density of the waste form (3.08 g/cm³) was measured by Archimedes' method using water as the suspending medium. The measured weight loss and the calculated particle dissolution rate for the two trials using the waste form designated F43WCF-1 are set forth in Table 13. As seen in Tables 11 and 13, there is good agreement between the bulk dissolution and particle dissolution rates for the F43WCF-1 waste form.

TABLE 13

| Trial | Weight Loss (g) | Dissolution Rate ($1 \times 10^{-8}$ g/cm² · min) |
|---|---|---|
| 1 | 0.0134 | 0.26 |
| 2 | 0.0135 | 0.26 |

EXAMPLE 5

In this Example, simulated iron phosphate waste is forms made from batch mixtures containing varying amounts of cesium or strontium were prepared. These compositions were investigated because radioactive Cs-137 and Sr-90 are present in many types of nuclear waste.

Batch mixtures (50 g) containing varying amounts of $Fe_2O_3$ and $P_2O_5$ combined with either $CS_2CO_3$ or $SrCO_3$ were used to prepare the waste forms. Due to the hygroscopic nature of $P_2O_5$, the raw materials were weighed quickly and then stored in a desiccator prior to melting. All of the batch mixtures were melted in high purity alumina crucibles in an electric furnace at temperatures between about 1100° and about 1200° C. for 1 to 2 hours. Once fluid, the melts were allowed to homogenize and fine for approximately 30 minutes during which time, they were stirred two or three times with a high purity alumina rod to aid in homogenization. The melts were cast into a steel mold to form bars (~1×1×2 to 4 cm) which were annealed at between about 500° and about 600° C. The resulting waste forms were opaque and black in color. For purposes of comparison, an iron phosphate glass was prepared from a batch mixture containing $Fe_2O_3$ and $P_2O_5$ without any $CS_2CO_3$ or $SrCO_3$.

The composition of the waste forms and the iron phosphate glass was determined by EDAX analysis as described in Example 1. The oxide composition of the batch mixtures and the composition of the waste forms and iron phosphate glass as determined by EDAX are set forth below in Table 14. As shown in Table 14, waste forms containing more than 40 weight percent $CS_2O$ and nearly 30 weight percent SrO were prepared. Furthermore, a small amount of $Al_2O_3$ was detected in some of the waste forms resulting from contamination of the melt by the alumina crucible used in preparing the melts.

TABLE 14

| | Composition (wt %) | | | | | | | | |
|---|---|---|---|---|---|---|---|---|---|
| | Batch Composition | | | | Analyzed EDAX Composition | | | | |
| Code | $Fe_2O_3$ | $P_2O_5$ | $Cs_2O$ | SrO | iron oxide | $P_2O_5$ | $Cs_2O$ | SrO | $Al_2O_3$ |
| F43 | 43.0 | 57.0 | 0.0 | 0.0 | 40.2 | 59.2 | 0.0 | 0.0 | 0.5 |
| FCs1 | 34.6 | 56.4 | 9.1 | 0.0 | 33.6 | 59.4 | 6.5 | 0.0 | 0.5 |
| FCs16 | 30.7 | 40.7 | 28.6 | 0.0 | 28.9 | 45.3 | 25.1 | 0.0 | 0.6 |
| FCs20 | 23.9 | 31.7 | 44.4 | 0.0 | 23.6 | 33.3 | 40.8 | 0.0 | 2.2 |
| FSr1 | 34.6 | 56.4 | 0.0 | 9.1 | 33.6 | 60.5 | 0.0 | 4.7 | 1.2 |
| FSr16 | 30.7 | 40.7 | 0.0 | 28.6 | 33.4 | 43.3 | 0.0 | 22.4 | 1.0 |
| FSr13 | 23.8 | 38.8 | 0.0 | 37.5 | 26.9 | 42.4 | 0.0 | 29.7 | 1.8 |

Samples were cut from the annealed bars for property measurement. The density of each of the waste forms was measured by the Archimredes' technique using kerosene as the suspending medium. The average linear thermal expansion coefficient ($\alpha$) and dilatometric softening temperature ($T_d$) were measured as described in Example 1. The chemical durability of the waste forms was assessed by measuring the bulk dissolution rate (DR) of the waste forms in distilled water as described in Example 1. The values for the measured density, thermal expansion coefficient and dilatometric softening temperature for the waste forms and iron phosphate glass are set forth below in Table 15. The estimated error in the dilatometric softening temperature is $\pm 5°$ C. The value of the thermal expansion coefficient reported in Table 15 is the calculated average from 25° to 300° C. and has an estimated error of $\pm 5 \times 10^{-7}/°C$.

TABLE 15

| Code | Density ($g/cm^3$) | $T_d$ (°C.) | $\alpha$ ($1 \times 10^{-7}/°C$.) |
|---|---|---|---|
| F43 | 3.04 | 485 | 55 |
| FCs1 | 3.07 | 525 | 66 |
| FCs16 | 3.48 | 520 | 100 |
| FCs20 | 3.70 | 475 | 155 |
| FSr1 | 3.20 | 530 | 75 |
| FSr16 | 3.75 | 615 | 125 |
| FSr13 | 3.90 | 637 | 122 |

Figure 14:
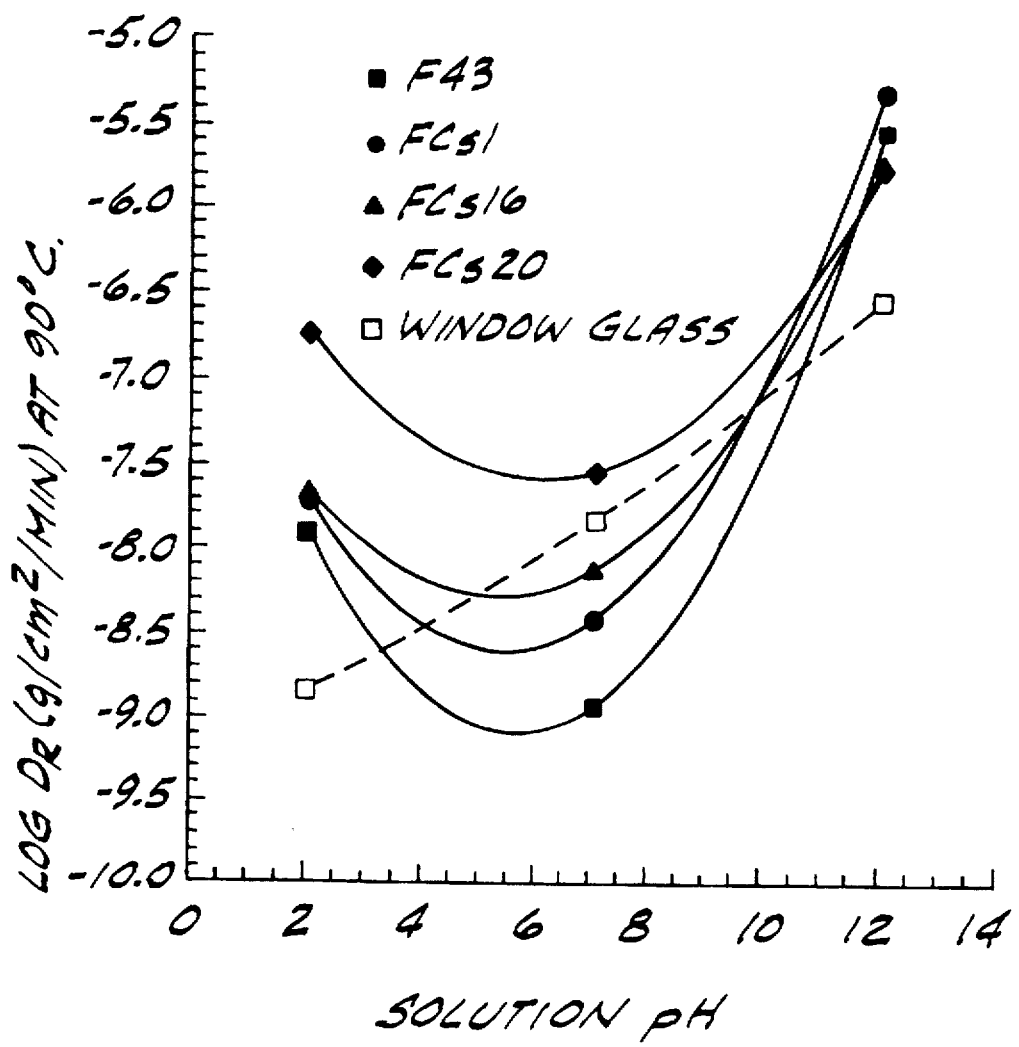
FIG. 14 shows the log of the bulk dissolution rate after 16 days of immersion at 90° C. plotted as a function of solution pH for the cesium-containing waste forms and iron phosphate glass prepared in Example 5.
Figure 15:
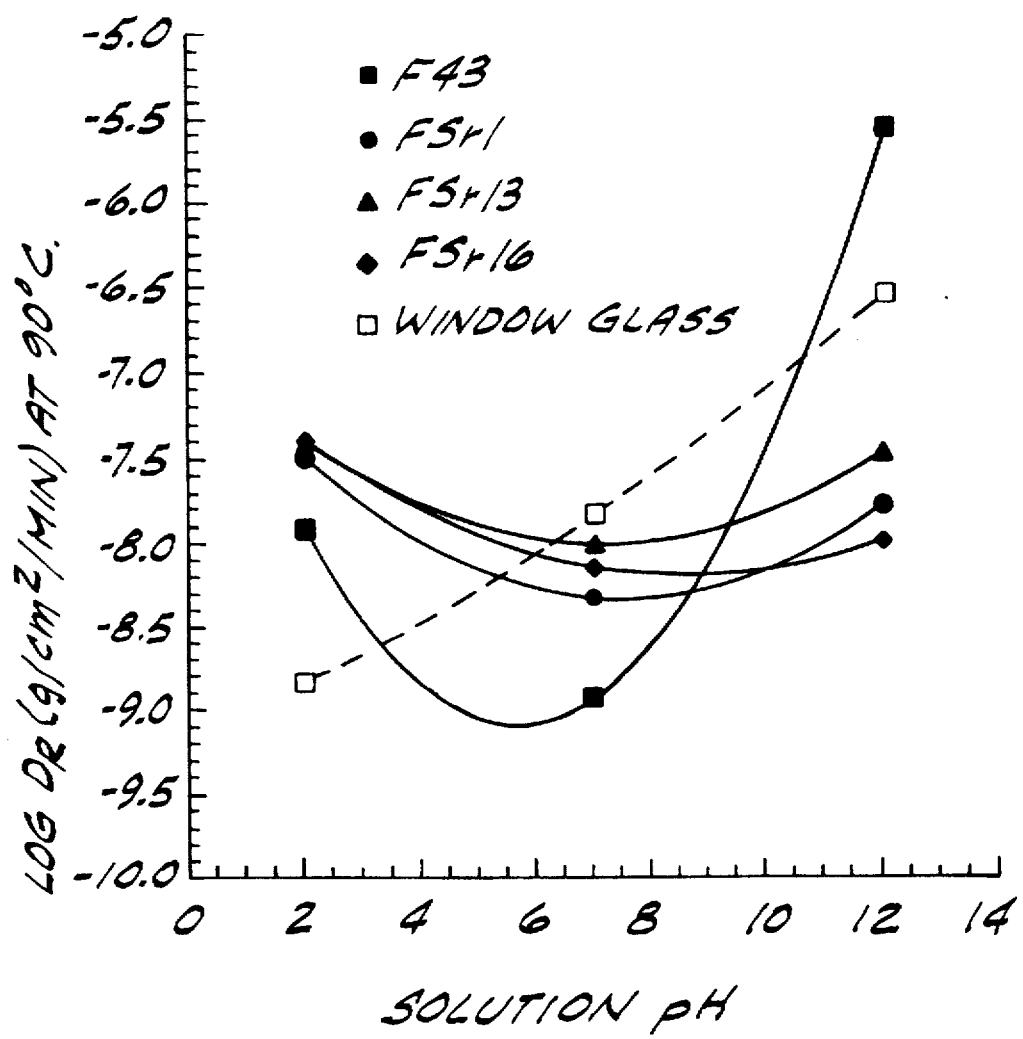
FIG. 15 shows the log of the bulk dissolution rate after 16 days of immersion at 90° C. plotted as a function of solution pH for the strontium-containing waste forms and iron phosphate glass prepared in Example 5.

The bulk dissolution rate (DR) of the iron phosphate waste forms and the iron phosphate glass was also measured in solutions of varying pH, specifically an HCl solution (pH 2) and a solution of $NH_4OH$ (pH 12). The log of the bulk dissolution rates for the cesium and strontium-containing waste forms after 16 days of immersion at 90° C. is plotted as a function of solution pH in FIGS. 14 and 15 respectively. Dissolution rate data for the binary iron phosphate glass (Code F-43) is also included for purposes of comparison. The dashed lines in FIGS. 14 and 15 represent the bulk dissolution rate of a typical window glass.

Each of the waste forms and the iron phosphate glass exhibited a U-shaped dissolution rate vs. pH curve, having a lower chemical durability (i.e., higher dissolution rate) in acidic or basic solutions, than in neutral distilled water. In HCl solution (pH 2), the chemical durability of the cesium and strontium-containing waste forms tended to be lower for the waste forms having higher waste element content. The dissolution rate of the cesium and strontium-containing waste forms in acidic solution ranged from about 1.9 to about $18 \times 10^{-8}$ $g/cm^2$.min and from about 3.2 to about $4.1 \times 10^{-8}$ $g/cm^2$.min, respectively. The chemical durability of the cesium-containing waste forms was lowest in the $NH_4OH$ solution exhibiting a dissolution rate ranging from about 1.7 to about $4.8 \times 10^{-6}$ $g/cm^2$.min. In the basic solution, the is dissolution rate of the cesium-containing waste forms were up to 100 times larger than in the acidic solution, but showed less dependence on waste cesium content. Conversely, the chemical durability of the strontium-containing waste forms did not vary as dramatically with pH. The dissolution rate of these waste forms in the basic solution ranged from about 1.1 to about $3.5 \times 10^{-8}$ $g/cm^2$.min, which is slightly less than their dissolution rate in the acidic solution. The chemical durability of both the cesium and strontium-containing waste forms was best in distilled water (pH 7). As in the acidic or basic solutions, the chemical durability of the waste forms decreased with greater waste element content. The dissolution rate in distilled water ranged from about 4.0 to about $25 \times 10^{-9}$ $g/cm^2$.min for the cesium-containing waste forms and from about 4.8 to about $10 \times 10^{-9}$ $g/cm^2$.min for the strontium-containing waste forms. With one exception (FCs20), the dissolution rates of the waste forms in distilled water were less than that for window glass.

The waste forms prepared in this Example were found to have a moderately high crystallization temperature, between about 600° and about 700° C. In order to determine how chemically durable the devitrified waste forms were in comparison to their glassy counterparts, samples of the waste forms were crystallized by heating them at about 650° C. for 24 hours. The bulk dissolution rate for these crystallized samples in the HCl and $NH_4OH$ solutions and distilled water was then measured. For purposes of comparison, the bulk dissolution rate of a crystallized sample of the iron phosphate glass was measured in these various solvents. The bulk dissolution rates for the devitrified and glassy iron phosphate glass and waste forms after 16 days of immersion at 90° C. are summarized in Table 16.

TABLE 16

| | | Dissolution Rate ($1 \times 10^{-8}$ $g/cm^2 \cdot min$) | | |
|---|---|---|---|---|
| Code | | HCl (pH 2) | Distilled Water (pH 7) | $NH_4OH$ (pH 12) |
| F43 | Glass | 1.3 | 0.13 | 250 |
| | Crystal | nm | nm | 790 |
| FCs1 | Glass | 2.0 | 0.40 | 500 |
| | Crystal | 1.6 | 0.10 | 250 |
| FCs16 | Glass | 2.5 | 0.79 | 200 |
| | Crystal | 1.0 | 0.79 | 63 |
| FCs20 | Glass | 20 | 3.2 | 160 |
| | Crystal | 400 | 400 | 630 |
| FSr1 | Glass | 3.2 | 0.50 | 2.0 |
| | Crystal | 100 | 79 | nm |

TABLE 16-continued

| | | Dissolution Rate (1 × 10⁻⁸ g/cm² · min) | | |
|---|---|---|---|---|
| Code | | HCl (pH 2) | Distilled Water (pH 7) | NH₄OH (pH 12) |
| FSr13 | Glass | 4.0 | 1.0 | 4.0 |
| | Crystal | 1.6 | 0.79 | 0.79 |
| FSr16 | Glass | 4.0 | 0.79 | 1.0 |
| | Crystal | 4.0 | 13 | 1.0 |

Figure 16:
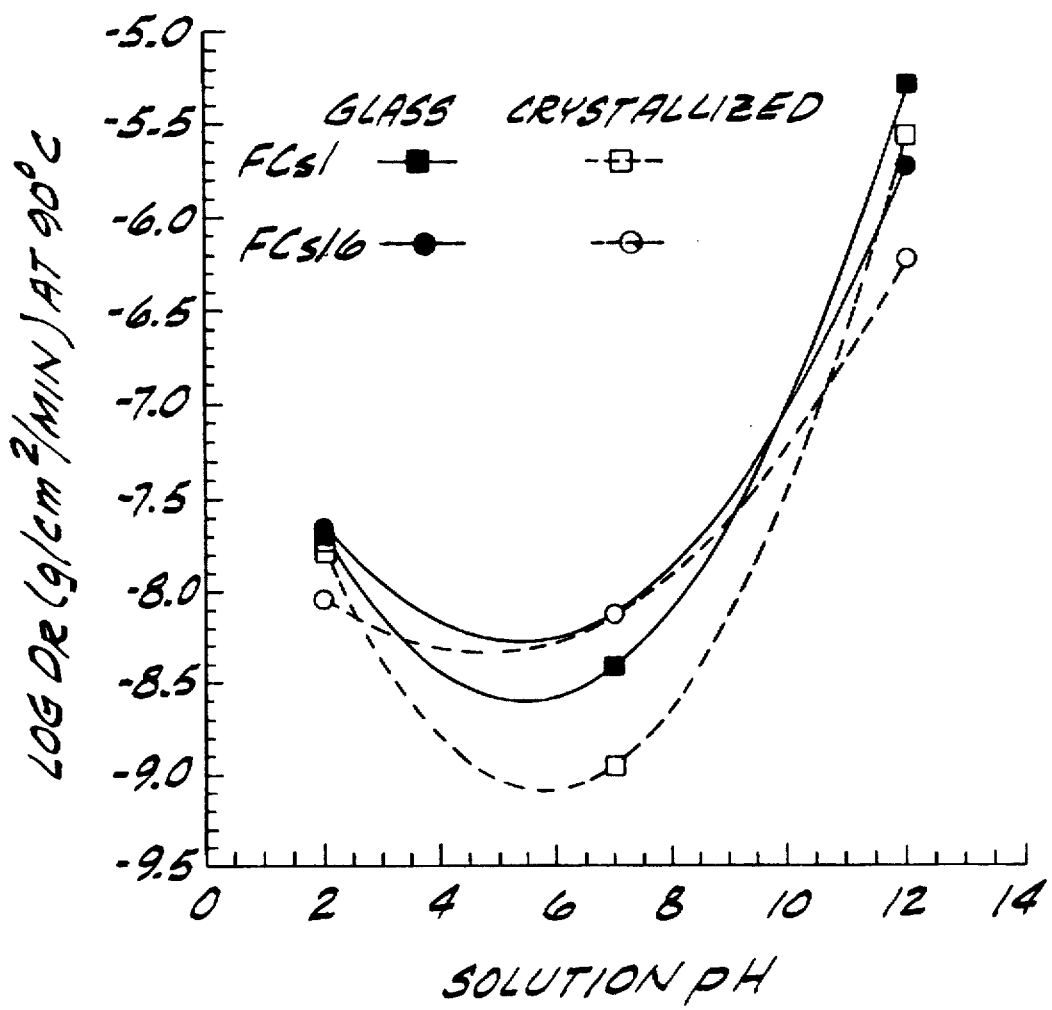
FIG. 16 shows the log of the bulk dissolution rate after 16 days of immersion at 90° C. plotted as a function of solution pH for glass and crystallized samples of the FCs1 and FCs16 waste forms prepared in Example 5.
Figure 17:
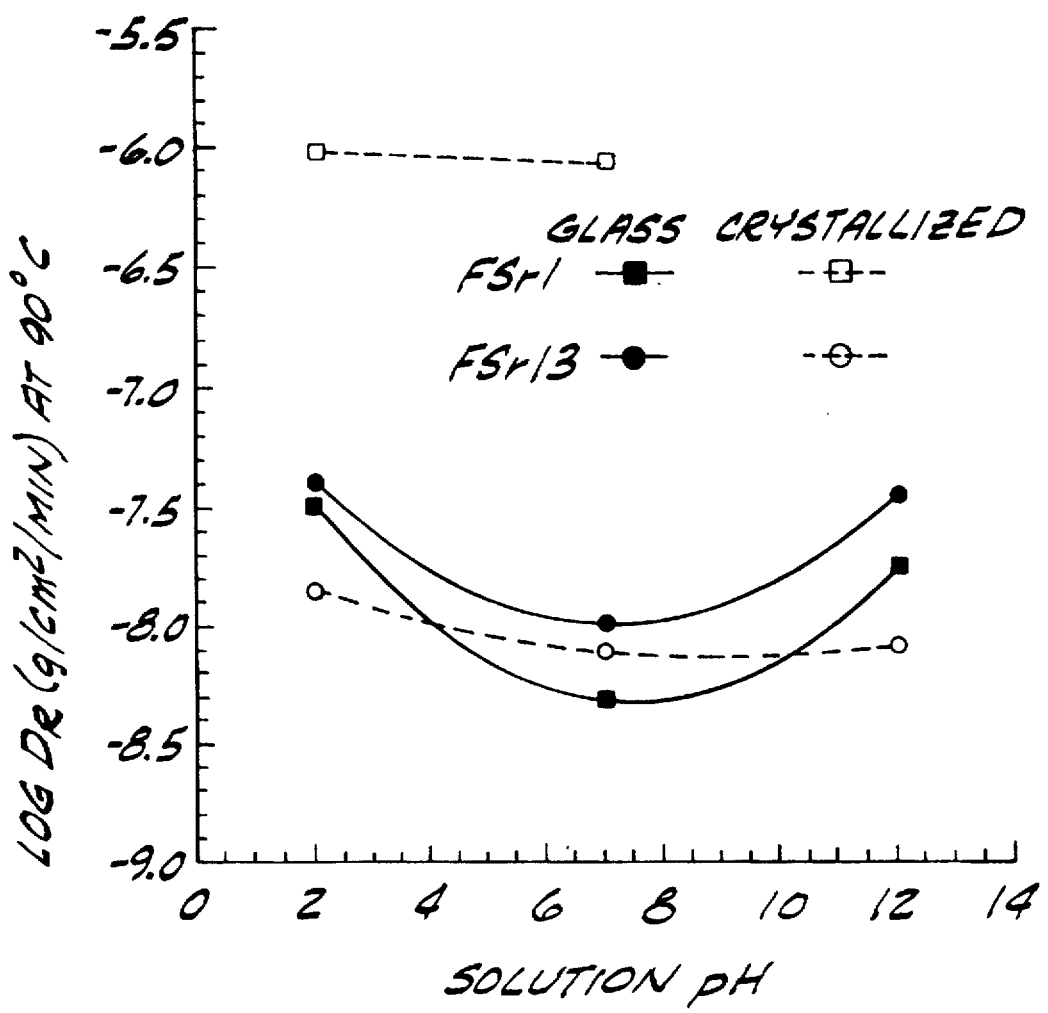
FIG. 17 shows the log of the bulk dissolution rate after 16 days of immersion at 90° C. plotted as a function of solution pH for glass and crystallized samples of the FSr1 and FSr13 waste forms prepared in Example 5.

The log of the bulk dissolution rate for glass and crystallized samples of the FCs1 and FCs16 waste forms is plotted as a function of solution pH in FIG. 16. The log of the bulk dissolution rate for glass and crystallized samples of the FSr1 and FSr13 waste forms is plotted as a function of solution pH in FIG. 17. With the exception of the FSr1 and FCs20 waste forms, the chemical durability did not change significantly after crystallization. In fact, some of the waste forms exhibited improved chemical durability once devitrified.

EXAMPLE 6

In this Example, simulated iron phosphate waste forms were prepared from batch mixtures similar to those used in preparing the FCs16 and FSr13 waste forms in Example 5, except that $CS_2CO_3$ and $SrCO_3$ were gradually replaced with cesium fluoride (CsF) and strontium fluoride ($SrF_2$), respectively.

The waste forms in this Example were prepared using the same procedure as set forth in Example 5 except that the batch mixtures were melted at lower temperatures (≦1000° C.) and appeared to be more fluid at their melting temperature. Also, the waste forms in this Example were annealed at lower temperatures (400° to 550° C.). The oxide composition of the batch mixtures for the waste forms prepared in this Example are set forth below in Table 17.

TABLE 17

| | Batch Composition (wt %) | | | | | |
|---|---|---|---|---|---|---|
| Code | Fe₂O₃ | P₂O₅ | Cs₂O | CsF | SrO | SrF₂ |
| FCs16(0F) | 30.7 | 40.7 | 28.6 | 0.0 | 0.0 | 0.0 |
| FCs16(1/4F) | 30.7 | 40.7 | 21.4 | 7.1 | 0.0 | 0.0 |
| FCs16(1/2F) | 30.7 | 40.7 | 14.3 | 14.3 | 0.0 | 0.0 |
| FCs16(3/4F) | 30.7 | 40.7 | 7.1 | 21.4 | 0.0 | 0.0 |
| FCs16(1/1F) | 30.7 | 40.7 | 0.0 | 28.8 | 0.0 | 0.0 |
| FSr13(0F) | 23.8 | 38.8 | 0.0 | 0.0 | 37.5 | 0.0 |
| FSr13(1/4F) | 23.8 | 38.8 | 0.0 | 0.0 | 28.1 | 9.4 |
| FSr13(1/2F) | 23.8 | 38.8 | 0.0 | 0.0 | 18.8 | 18.8 |
| FSr13(3/4F) | 23.8 | 38.8 | 0.0 | 0.0 | 9.4 | 28.1 |
| FSr13(1/1F) | 23.8 | 38.8 | 0.0 | 0.0 | 0.0 | 37.5 |

Samples were cut from the annealed bars for property measurement. The density, average linear thermal expansion coefficient (α) and dilatometric softening temperature ($T_d$) were measured as described in Example 5. The values of these measured properties are set forth below in Table 18. The estimated error in the dilatometric softening temperature is ±5° C. The value of the thermal expansion coefficient reported in Table 18 is the calculated average from 25° to 300° C. and has an estimated error of $\pm 5 \times 10^{-7}$/°C.

TABLE 18

| Code | Density (g/cm₂) | $T_d$ (°C.) | α (1 × 10⁻⁷/°C.) |
|---|---|---|---|
| FCs16(0F) | 3.48 | 520 | 100 |
| FCs16(1/4F) | 3.43 | 522 | 123 |
| FCs16(1/2F) | 3.42 | 504 | 124 |
| FCs16(3/4F) | 3.35 | 492 | 122 |
| FCs16(1/1F) | 3.40 | 507 | 120 |
| FSr13(0F) | 3.90 | 637 | 122 |
| FSr13(1/4F) | 3.78 | 632 | 127 |
| FSr13(1/2F) | 3.71 | 626 | 128 |
| FSr13(3/4F) | 3.76 | 580 | 114 |
| FSr13(1/1F) | 3.79 | 570 | 126 |

The chemical durability of the waste forms was assessed by measuring the bulk dissolution rate (DR) of the waste forms in distilled water (pH 7) and solutions of HCl (pH 2) and NH₄OH (pH 12) as described in Example 5. The log of the bulk dissolution rate for cesium iron fluorophosphate and strontium iron fluorophosphate waste forms after 16 days of immersion at 90° C. is plotted as a function of solution pH in FIGS. 18 and 19 respectively. The bulk dissolution rate values for all of the cesium iron fluorophosphate and strontium iron fluorophosphate waste forms lie between the solid lines in FIGS. 18 and 19, respectively. The dashed lines in FIGS. 18 and 19 represent the bulk dissolution rate of a typical window glass.

Figure 18:
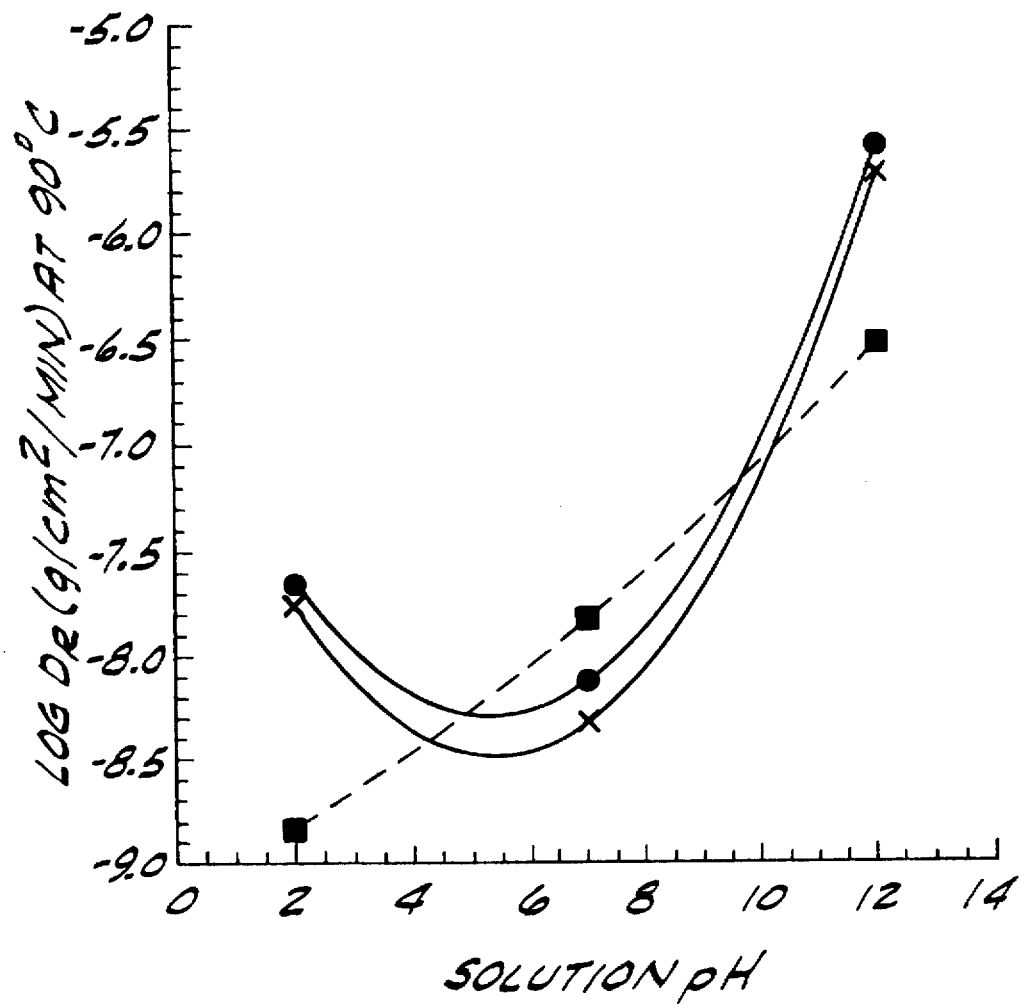
FIG. 18 shows the log of the bulk dissolution rate after 16 days of immersion at 90° C. plotted as a function of solution pH for the cesium iron fluorophosphate waste forms prepared in Example 6.
Figure 19:
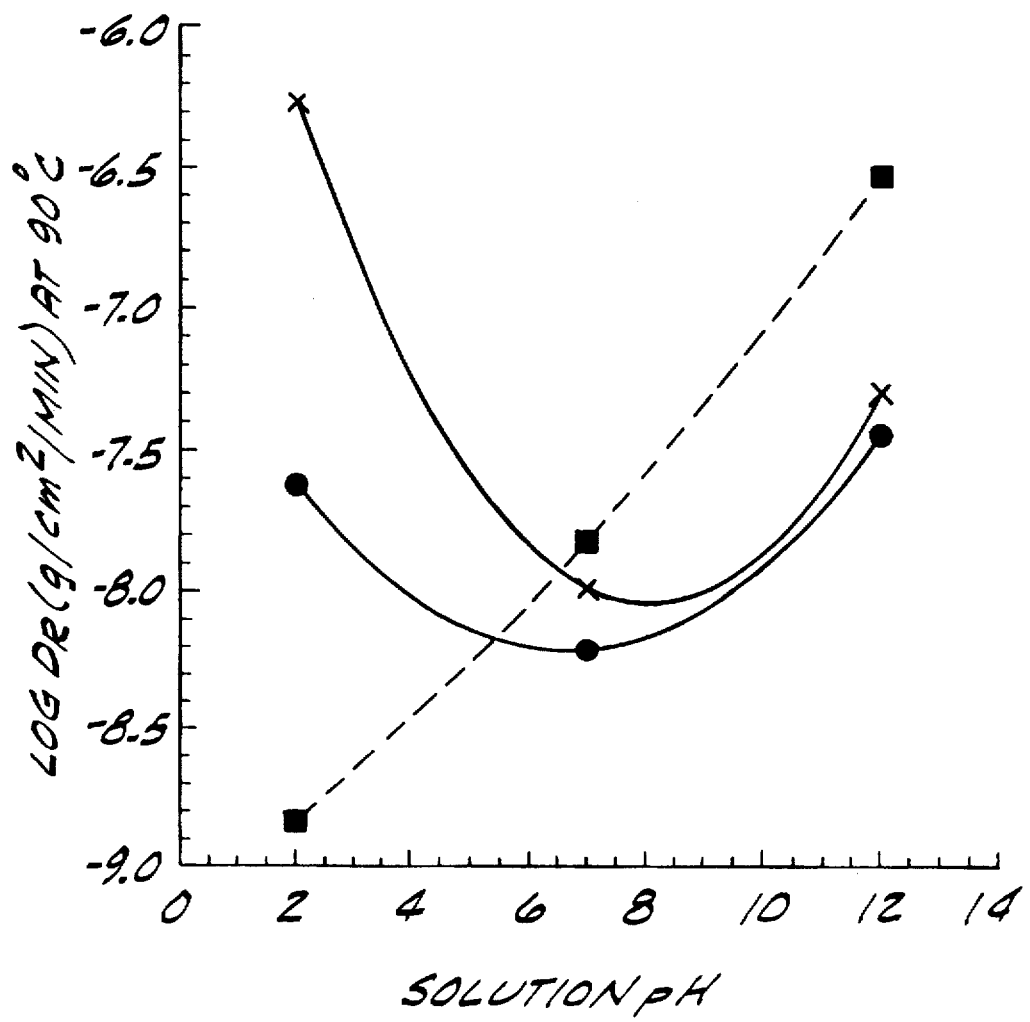
FIG. 19 shows the log of the bulk dissolution rate after 16 days of immersion at 90° C. plotted as a function of solution pH for the strontium iron fluorophosphate waste forms prepared in Example 6.

The bulk dissolution rate of the cesium iron fluorophosphate waste forms listed in Table 17 did not change appreciably with increasing fluorine content in the batch, falling between the solid lines in FIG. 18. Similarly, the bulk dissolution rate of the strontium iron fluorophosphate waste forms did not vary substantially as SrO was replaced with $SrF_2$ in the batch except in the acidic solution as can be seen in FIG. 19. When phosphate glasses are dissolved in solution, the phosphate chains, which are the glass forming network are not broken down, but dissolved away as whole chains. The phosphate chain length therefore is a determining factor to the chemical durability of a phosphate glass. As fluorine (or other halide) is added to an iron phosphate glass, the size of the polyphosphate chains may decrease, if the bridging P—O—P or P—O—Fe bonds are replaced by terminal P—F bonds. The incorporation of fluorine or other halide into a phosphate glass structure, therefore, could be expected to increase the dissolution rate of the glass. However, the overall lack of appreciable change in chemical durability as fluorine was added to the batch mixtures used to prepare the cesium and strontium iron fluorophosphate waste forms, could be interpreted to mean that little or no fluorine was actually incorporated into the waste form structure or that the fluorine formed cross-linking, not terminal P—F bonds.

The FCs16(1/2F), FCs16(1/1F), FSr13(1/2F) and FSr13 (1/1F) waste forms were crystallized and the bulk dissolution rate of these devitrified samples was measured in solutions of varying pH following the same procedures used for the corresponding glassy samples. The bulk dissolution rates of the devitrified and glassy waste forms, after 16 days of immersion at 90° C. are summarized in Table 19.

TABLE 19

| | | Dissolution Rate (1 × 10⁻⁸ g/cm² · min) | | |
|---|---|---|---|---|
| Code | | HCl (pH 2) | Distilled Water (pH 7) | NH₄OH (pH 12) |
| FCs16 | Glass | 2.0 | 0.50 | 250 |
| (1/2F) | Crystal | 2.0 | 1.0 | 100 |
| FCs16 | Glass | 2.0 | 0.50 | 200 |
| (1/1F) | Crystal | 1.6 | 1.0 | 160 |
| FSr13 | Glass | 10 | 0.79 | 5.0 |
| (1/2F) | Crystal | 6.3 | 2.0 | 6.3 |
| FSr13 | Glass | 3.2 | 0.79 | 4.0 |
| (1/1F) | Crystal | 25 | 0.63 | 0.79 |

As shown in Table 19, the chemical durability of the cesium and strontium iron fluorophosphate waste forms was not significantly altered by devitrification.

EXAMPLE 7

In both Examples 5 and 6, simulated iron phosphate waste forms were made containing only one simulated waste element, either cesium or strontium. Both the cesium and strontium-containing waste forms exhibited a good overall chemical durability, but the cesium-containing waste forms showed a better chemical durability in acidic solutions, whereas the strontium-containing waste forms tended to have a better chemical durability in basic solutions.

In this Example, iron phosphate waste forms were prepared from batch mixtures containing both cesium and strontium to determine whether such waste forms exhibited better overall chemical durability than waste forms containing only either cesium or strontium. In addition, the $Cs_2CO_3$ and $SrCO_3$ in the batch mixtures were gradually replaced with cesium chloride (CsCl) or cesium fluoride (CsF) and strontium fluoride ($SrF_2$), respectively. These latter compositions were investigated because radioactive Cs-137 and Sr-90 in nuclear waste are often present as CsCl and $SrF_2$.

The waste forms in this Example were prepared using the same procedure as set forth in Example 6. The oxide composition of the batch mixtures for the waste forms prepared in this Example are set forth below in Table 20.

TABLE 20

| | Batch Composition (wt %) | | | | | | |
|---|---|---|---|---|---|---|---|
| Code | Fe₂O₃ | P₂O₅ | Cs₂O | SrO | CsCl | CsF | SrF₂ |
| FCsSr(0Cl,F) | 27.2 | 39.7 | 14.3 | 18.8 | 0.0 | 0.0 | 0.0 |
| FCsSr(1/2F) | 27.2 | 39.7 | 7.14 | 7.14 | 0.0 | 9.38 | 9.38 |
| FCsSr(1/4Cl,F) | 27.2 | 39.7 | 10.7 | 14.1 | 3.6 | 0.0 | 4.7 |
| FCsSr(1/2Cl,F) | 27.2 | 39.7 | 7.1 | 9.4 | 7.1 | 0.0 | 9.4 |
| FCsSr(1/1Cl,F) | 27.2 | 39.7 | 0.0 | 0.0 | 14.3 | 0.0 | 18.8 |

The bulk dissolution rate of the FCsSr(1/2F) waste form was measured in the HCl (pH 2) and NH₄OH (pH 12) solutions and in distilled water (pH 7) after 16 days of immersion at 90° C. The log of the bulk dissolution rate for the FCsSr(1/2F) waste form is plotted as a function of solution pH in FIG. 20. For purposes of comparison, the log of the bulk dissolution rate for the FCs16(1/2F) and FSr13 (1/2F) waste forms prepared in Example 6 is also plotted as a function of solution pH in FIG. 20.

Figure 20:
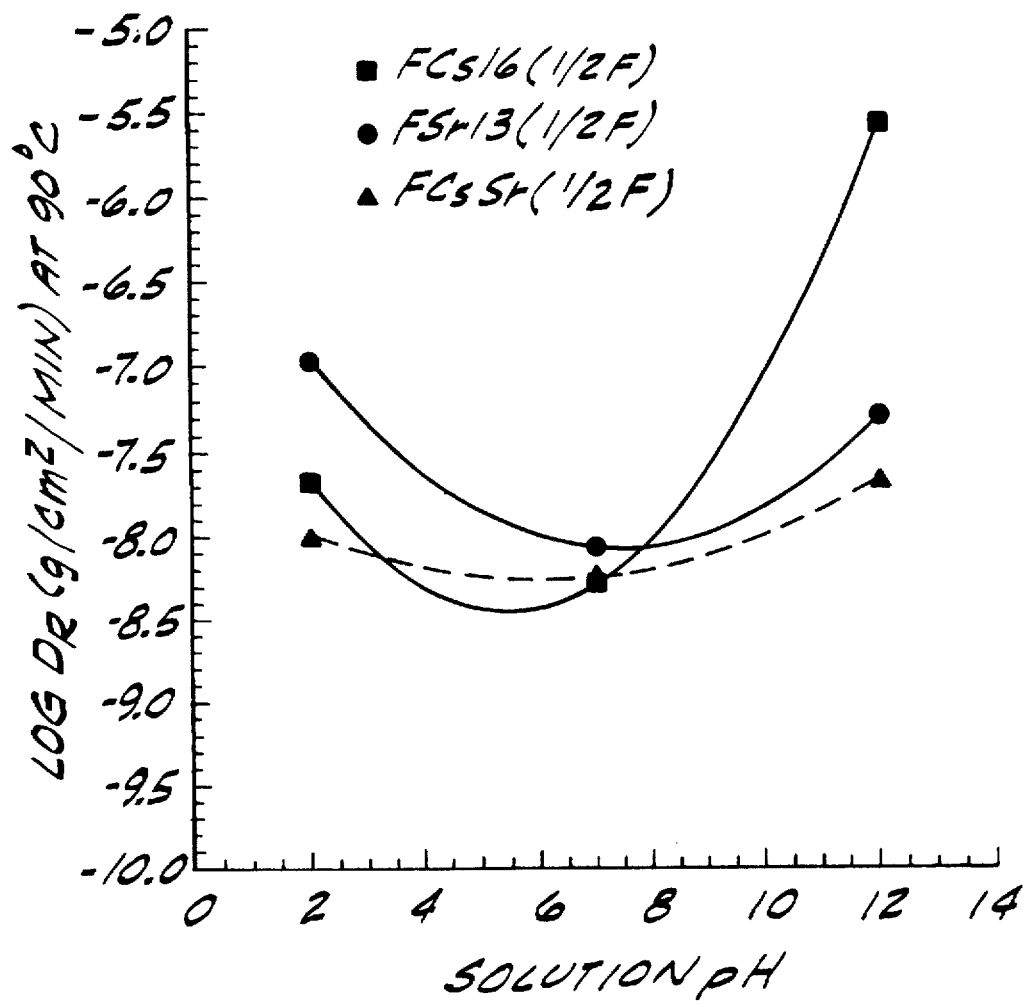
FIG 20. shows the log of the bulk dissolution rate after 16 days of immersion at 90° C. plotted as a function of solution pH for the FCsSr(1/2F) waste form prepared in Example 7 and the FCs16(1/2F) and FSr13(1/2F) waste forms prepared in Example 6.

The results in FIG. 20 show that the chemical durability of the waste form containing both cesium and strontium has a superior chemical durability substantially throughout the pH range from 2 to 12 and is less variable with pH as compared to the FCs16(1/2F) and FSr13(1/2F) waste forms which contain only cesium or strontium, respectively.

The bulk dissolution rate of the rest of the waste forms listed in Table 20 was measured in distilled water (pH 7) at 90° C. The results are set forth below in Table 21. The bulk dissolution rate for the FCsSr(1/4Cl,F) and FCsSr(1/2Cl,F) waste forms was measured after 14 days of immersion while the remainder of the bulk dissolution rates reported in Table 21 correspond to 16 days of immersion. For purposes of comparison, the bulk dissolution rate for the FCs16 and FSr13 waste forms prepared in Example 5 are provided in Table 21.

TABLE 21

| Code | Dissolution Rate (1 × 10⁻⁸ g/cm² · min) |
|---|---|
| FCsSr(0Cl,F) | 1.3 |
| FCsSr(1/4Cl,F) | 1.0 |
| FCsSr(1/2Cl,F) | 0.72 |
| FCsSr(1/1Cl,F) | 2.6 |
| FCs16 | 0.75 |
| FSr13 | 1.0 |

Figure 21:
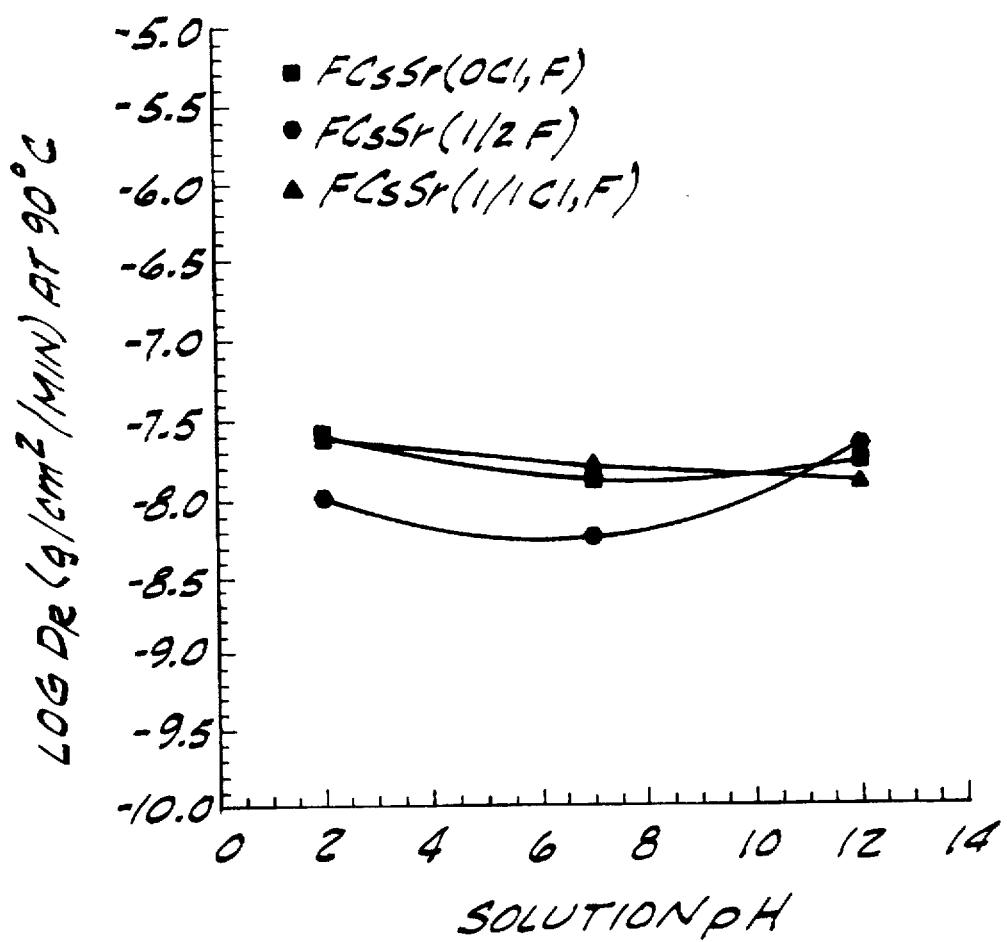
FIG. 21 shows the log of the bulk dissolution rate after 16 days of immersion at 90° C. plotted as a function of solution pH for the FCsSr(1/2F), FCsSr(0Cl,F) and FCsSr(1/1Cl,F) waste forms prepared in Example 7.

The bulk dissolution rate of the FCsSr(0Cl,F) and FCsSr (1/1Cl,F) waste forms was measured in the HCl (pH 2) and NH₄OH (pH 12) solutions after 16 days of immersion at 90° C. The log of the bulk dissolution rate for these waste forms and for the FCsSr(1/2F) waste form is plotted as a function of solution pH in FIG. 21.

The results in Example 5–7 show that large amounts of radioactive Cs-137 and Sr-90 can advantageously be mutually disposed of in an iron phosphate waste form of the present invention which exhibits a high chemical durability in solutions of varying pH. Furthermore, the chemical durability of such waste forms is largely unaffected by either the fact that the radioactive cesium and strontium compounds are present in the batch mixture as halides (e.g., CsCl and $SrF_2$) or whether the iron phosphate waste form is wholly or partly devitrified.

In view of the above, it will be seen that the several objects of the invention are achieved. As various changes could be made in the above-described invention without departing from the scope of the invention, it is intended that all matter contained in the above description be interpreted as illustrative and not in a limiting sense.

What is claimed is:

1. A waste form for containment of hazardous metal waste, said waste form comprising a rigid iron phosphate matrix resulting from the cooling of a melt formed by heating a batch mixture comprising said metal waste and a matrix-forming component, said waste form comprising from about 30 to about 70 weight percent $P_2O_5$ and from about 22 to about 50 weight percent iron oxide and having metals present in said metal waste chemically dissolved therein.

2. A waste form as set forth in claim 1 wherein said metal waste is radioactive.

3. A waste form as set forth in claim 1 wherein the dissolution rate of said waste form in distilled water having a pH from about 6.5 to about 7.3 at 90° C. is less than about $1 \times 10^{-7}$ g/cm²·min.

4. A waste form as set forth in claim 3 wherein the dissolution rate of said waste form in distilled water having a pH from about 6.5 to about 7.3 at 90° C. is less than about $5 \times 10^{-8}$ g/cm²·min.

5. A method for containment of hazardous metal waste in a rigid waste form comprising:

heating a batch mixture comprising said metal waste and a matrix-forming component at a temperature not in excess of about 1250° C. to form a melt; and cooling said melt to form said rigid waste form having metals present in said metal waste chemically dissolved therein, said batch mixture having a composition such that said waste form comprises from about 30 to about 70 weight percent $P_2O_5$ and from about 22 to about 50 weight percent iron oxide.

6. A method as set forth in claim 5 wherein the composition of said batch mixture has a composition such that said waste form comprises at least about 30 weight percent iron oxide.

7. A method as set forth in claim 5 wherein said batch mixture comprises at least about 1 weight percent metal halide.

8. A method as set forth in claim 7 wherein said batch mixture comprises at least about 5 weight percent metal halide.

9. A method as set forth in claim 5 wherein said melt is prepared under sufficiently oxidizing conditions such that at least about 50 percent of the iron contained in said waste form is present in the form of $Fe^{3+}$.

10. A method as set forth in claim 9 wherein the melt is prepared under sufficiently oxidizing conditions such that at least about 80 percent of the iron contained in said waste form is present in the form of $Fe^{3+}$.

11. A method as set forth in claim 5 wherein said matrix-forming component comprises a lead-free, iron phosphate host glass having a melting temperature not in excess of about 1250° C.

12. A method as set forth in claim 5 wherein the composition of said batch mixture and the rate of cooling of said melt are controlled such that said waste form is substantially vitreous.

13. A waste form for containment of hazardous metal waste, said waste form comprising a rigid iron phosphate matrix resulting from the cooling of a melt formed by heating a batch mixture comprising said metal waste and a matrix-forming component, said waste form comprising from about 30 to about 70 weight percent $P_2O_5$ and from about 30 to about 50 weight percent iron oxide and having metals present in said metal waste chemically dissolved therein.

14. A waste form as set forth in claim 13 wherein said waste form comprises at least about 40 weight percent $P_2O_5$.

15. A waste form for containment of hazardous metal waste, said waste form comprising a rigid iron phosphate matrix resulting from the cooling of a melt formed by heating a batch mixture comprising said metal waste and a matrix-forming component, said waste form comprising from about 30 to about 70 weight percent $P_2O_5$ and from about 22 to about 50 weight percent iron oxide and having metals present in said metal waste chemically dissolved therein, at least about 50 percent of the iron contained in said waste form being present in the form of $Fe^{3+}$.

16. A waste form as set forth in claim 15 wherein at least about 80 percent of the iron contained in said waste form is present in the form of $Fe^{3+}$.

17. A waste form for containment of hazardous metal waste, said waste form comprising a rigid iron phosphate matrix resulting from the cooling of a melt formed by heating a batch mixture comprising said metal waste and a matrix-forming component, said batch mixture comprising at least about 1 weight percent metal halide, said waste form comprising from about 30 to about 70 weight percent $P_2O_5$ and from about 22 to about 50 weight percent iron oxide and having metals present in said metal waste chemically dissolved therein.

18. A waste form as set forth in claim 17 wherein said metal halide present in said batch mixture is selected from the group consisting of alkali metal fluorides, alkali metal chlorides, alkaline earth metal fluorides and alkaline earth metal chlorides.

19. A waste form as set forth in claim 18 wherein said metal halide present in said batch mixture is $CaF_2$.

20. A waste form as set forth in claim 17 wherein said batch mixture comprises at least about 5 weight percent metal halide.

21. A waste form for containment of hazardous metal waste, said waste form comprising a rigid iron phosphate matrix resulting from the cooling of a melt formed by heating a batch mixture comprising said metal waste and a matrix-forming component, said waste form comprising from about 30 to about 70 weight percent $P_2O_5$ and from about 38 to about 45 weight percent iron oxide and having metals present in said metal waste chemically dissolved therein.

22. A waste form for containment of hazardous metal waste, said waste form comprising a rigid iron phosphate matrix resulting from the cooling of a melt formed by heating a batch mixture comprising said metal waste and a matrix-forming component, said hazardous metal waste comprising at least one compound selected from the group consisting of radioactive CsF, $SrF_2$, CsCl and $SrCl_2$, said waste form comprising from about 30 to about 70 weight percent $P_2O_5$ and from about 22 to about 50 weight percent iron oxide and having metals present in said metal waste chemically dissolved therein.

* * * * *